US012574430B2

(12) United States Patent
Harviainen et al.

(10) Patent No.: US 12,574,430 B2
(45) Date of Patent: Mar. 10, 2026

(54) DISTRIBUTED EXTENDED REALITY (XR) COMPUTING OPTIMIZATION AT CLIENT DEVICE IN COMMUNICATION WITH EDGE NODE

(71) Applicant: Adeia Guides Inc., San Jose, CA (US)

(72) Inventors: Tatu V.J. Harviainen, Helsinki (FI); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 101 days.

(21) Appl. No.: 18/518,023

(22) Filed: Nov. 22, 2023

(65) Prior Publication Data

US 2025/0168218 A1 May 22, 2025

(51) Int. Cl.
| | |
|---|---|
| *H04L 65/80* | (2022.01) |
| *G06T 7/246* | (2017.01) |
| *G06T 15/00* | (2011.01) |
| *H04L 65/61* | (2022.01) |

(52) U.S. Cl.
CPC .............. *H04L 65/80* (2013.01); *G06T 7/246* (2017.01); *G06T 15/00* (2013.01); *H04L 65/61* (2022.05); *G06T 2207/30204* (2013.01)

(58) Field of Classification Search
CPC ......... H04L 65/80; H04L 65/61; G06T 7/246; G06T 15/00; G06T 2207/30204
See application file for complete search history.

(56) References Cited

U.S. PATENT DOCUMENTS

| | | | |
|---|---|---|---|
| 7,642,989 | B2 | 1/2010 | Cheong et al. |
| 7,990,374 | B2 | 8/2011 | Itkowitz et al. |
| 8,540,571 | B2 | 9/2013 | Grant et al. |
| 9,558,637 | B2 | 1/2017 | Heubel et al. |
| 10,587,748 | B1 | 3/2020 | Bender et al. |
| 10,686,858 | B1 | 6/2020 | Gandhi et al. |
| 10,701,663 | B2 | 6/2020 | Levesque et al. |
| 11,005,775 | B2 | 5/2021 | Desai |

(Continued)

FOREIGN PATENT DOCUMENTS

WO          2023/099233 A1      6/2023

OTHER PUBLICATIONS

E. Gatti., et al., "Haptic Rules! Augmenting the gaming experience in the traditional games: The case of Foosball," Jun. 1, 2017 IEEE World Haptics Conference, 432-435 (2017).

(Continued)

*Primary Examiner* — Oleg Survillo
(74) *Attorney, Agent, or Firm* — HG Law LLP

(57) ABSTRACT

Methods and systems are described for distributed extended reality (XR) computing optimization for an edge node connectable to a client device and an XR content server across a network. XR computing is apportioned to the edge node and the client device so that a wide variety of client devices, from light to heavy, are accommodated based on metrics of the edge node, the client device, the XR content server, and the network. Some of the apportionments include extraction of feature descriptors by the client device to avoid transmitting full image data from the client device to the edge node. The feature descriptors are used for tracking initialization and frame to frame tracking. Overall system performance is improved delivering an improved user experience. Related apparatuses, devices, techniques, and articles are also described.

20 Claims, 20 Drawing Sheets

(56) References Cited

U.S. PATENT DOCUMENTS

| | | | |
|---|---|---|---|
| 11,101,906 B1 * | 8/2021 | Jiang | H04H 20/12 |
| 11,294,723 B1 * | 4/2022 | Mathew | H04L 67/34 |
| 11,361,633 B2 | 6/2022 | Valanarasu et al. | |
| 11,423,624 B2 | 8/2022 | Dedonato et al. | |
| 11,651,336 B1 | 5/2023 | Alonzo et al. | |
| 11,670,014 B2 | 6/2023 | Kreiner et al. | |
| 11,722,718 B2 | 8/2023 | Harviainen | |
| 11,792,259 B1 * | 10/2023 | Paczkowski | H04L 67/10 |
| | | | 709/201 |
| 11,838,453 B2 | 12/2023 | Phillips | |
| 11,924,216 B2 | 3/2024 | Thomas | |
| 12,179,095 B2 | 12/2024 | Phillips | |
| 12,231,483 B1 * | 2/2025 | Harviainen | H04L 65/80 |
| 12,271,525 B2 | 4/2025 | Harviainen | |
| 12,317,298 B2 * | 5/2025 | Hishmeh | H04W 72/51 |
| 12,342,011 B1 * | 6/2025 | Wang | H04N 21/23418 |
| 2003/0058216 A1 | 3/2003 | Lacroix et al. | |
| 2011/0034176 A1 * | 2/2011 | Lord | H04M 1/0264 |
| | | | 348/241 |
| 2015/0031393 A1 | 1/2015 | Post et al. | |
| 2015/0070149 A1 | 3/2015 | Cruz-Hernandez et al. | |
| 2015/0302665 A1 | 10/2015 | Miller | |
| 2015/0334430 A1 | 11/2015 | Clapp | |
| 2016/0175703 A1 | 6/2016 | Venkatesan et al. | |
| 2016/0238040 A1 | 8/2016 | Gallo et al. | |
| 2017/0070389 A1 * | 3/2017 | Rhoades | H04L 41/0823 |
| 2017/0075701 A1 | 3/2017 | Ricci et al. | |
| 2017/0287220 A1 | 10/2017 | Khalid et al. | |
| 2017/0303166 A1 | 10/2017 | Abuelsaad et al. | |
| 2018/0005497 A1 | 1/2018 | Venkatesan | |
| 2018/0084305 A1 | 3/2018 | Sprenger et al. | |
| 2018/0227063 A1 | 8/2018 | Heubel et al. | |
| 2018/0341323 A1 | 11/2018 | Mate et al. | |
| 2018/0373337 A1 | 12/2018 | Modarres et al. | |
| 2019/0182734 A1 | 6/2019 | Laliberte | |
| 2019/0208007 A1 | 7/2019 | Khalid | |
| 2020/0026354 A1 | 1/2020 | Swindells | |
| 2020/0142484 A1 | 5/2020 | Maalouf et al. | |
| 2020/0142487 A1 | 5/2020 | Modarres et al. | |
| 2021/0150818 A1 * | 5/2021 | Dedonato | G06F 3/011 |
| 2022/0092308 A1 * | 3/2022 | Asbun | H04W 4/30 |
| 2022/0245903 A1 | 8/2022 | Saxena et al. | |
| 2022/0255988 A1 * | 8/2022 | Salmasi | H04L 67/12 |
| 2022/0303185 A1 * | 9/2022 | Marshall | H04L 41/0893 |
| 2022/0394225 A1 | 12/2022 | Champion et al. | |
| 2022/0408097 A1 * | 12/2022 | Lin | H04N 19/136 |
| 2023/0105481 A1 | 4/2023 | Kreiner et al. | |
| 2023/0249064 A1 | 8/2023 | Murphy et al. | |
| 2023/0341941 A1 | 10/2023 | Clark et al. | |
| 2023/0360329 A1 * | 11/2023 | Esquivel | G06F 9/547 |
| 2023/0410384 A1 | 12/2023 | Pajouh et al. | |
| 2024/0056984 A1 * | 2/2024 | Novlan | H04W 28/0263 |
| 2024/0242443 A1 * | 7/2024 | Nallabolu | G06T 19/006 |
| 2024/0244224 A1 * | 7/2024 | Kalasibail Seetharam | |
| | | | H04N 21/23439 |
| 2024/0427419 A1 | 12/2024 | Harviainen | |
| 2024/0427420 A1 | 12/2024 | Harviainen et al. | |
| 2025/0039987 A1 * | 1/2025 | Salmasi | G06T 19/006 |
| 2025/0063078 A1 | 2/2025 | Harviainen et al. | |
| 2025/0080787 A1 * | 3/2025 | Tashtarian | H04N 21/2187 |
| 2025/0133254 A1 * | 4/2025 | Dai | H04N 21/8456 |
| 2025/0165306 A1 * | 5/2025 | Harviainen | G06T 19/006 |
| 2025/0227138 A1 | 7/2025 | Harviainen et al. | |

OTHER PUBLICATIONS

J. Sachs, et al., "Adaptive 5G Low-Latency Communication for Tactile Internet Services," Proceedings of the IEEE, 107(2):354-349 (2018).

U.S. Appl. No. 19/012,688, filed Jan. 7, 2025, Tatu V.J. Harviainen.

Joeng-Mook Lim et al., An Audio-Haptic Feedbacks for enhancing User Experience, Jan. 1, 2013, IEEE International Conference on Consumer Electronics, pp. 49-50 (Year: 2013).

Marco Gaudina et al., Virtual Social Multimedia Streaming with a Novel Haptic Device, May 1, 2012, Proceedings of the 35th International Convention MIPRO, pp. 1009-1016 (Year: 2012).

Aittala, "Inverse lighting and photorealistic rendering for augmented reality," Visual Computer, 26:669-678 (2010).

Anonymous, "ETSI TR 126 928 V17.0.0 (May 2002)," Technical Report, 5G; Extended Reality (XR) in 5G 3GPP TR 26.928 version 17.0.0 Release 17) (2022) (133 pages).

Anonymous, "Get the lighting right," Platform-Specific Guides, Google ARCore Documentation (2023) (13 pages).

Bross et al., "Overview of the Versatile Video Coding (VVC) Standard and its Applications," IEEE Transactions on Circuits and Systems for Video Technology, 31(10):3736-3764 (2021).

Lai et al., "Furion: Engineering High-Quality Immersive Virtual Reality on Today's Mobile Devices," Paper Session VIII: Frameworks and Such, MobiCom'17, Oct. 16-20, 2017 (13 pages).

Ohlsson et al., "Reducing mobility interruption time in 5G networks," Ericsson Blog, Apr. 2, 2020 (9 pages).

Rehman et al., "A Survey of Handover Management in Mobile HetNets: Current Challenges and Future Directions," Applied Sciences, 13(5):3367 (2023).

Siriwardhana et al., "A Survey on Mobile Augmented Reality With 5G Mobile Edge Computing: Architectures, Applications, and Technical Aspects," IEEE Communications Surveys & Tutorials, 23(2):1160-1192, Secondquarter 2021.

Wang et al., "Learning Indoor Inverse Rendering with 3D Spatially-Varying Lighting," ICCV 2021 open access, Proceedings of the IEEE/CVF International Conference on Computer Vision (ICCV), 2021, pp. 12538-12547 (10 pages).

Xia, "New advances for haptic rendering: state of the art," The Visual Computer 34.2, 271-287 (2018).

"Common Test Conditions for MPEG Immersive Video", ISO/IEC JTC 1/SC29/WG04, N0203, Apr. 29, 2022.

"IEEE SA Standards Association—IEEE SA Beyond Standards", retrieved at https://standards.ieee.org/beyond-standards/, on Jun. 20, 2023.

"Immersion | Author Archives: Chris Ullrich", retrieved at https://www.immersion.com/author/cullrich/, on Jun. 20, 2023.

"The Haptics Industry Forum", retrieved at https://hapticsif.org/, Jun. 20, 2023.

Anonymous , "ARcore", Anonymous, "ARCore" [Retrieved from https://developers.google.com/ar] (8 Pages).

Anonymous , "Augmented Reality-More to explore with ARKit 6", Anonymous, "Augmented Reality-More to explore with ARKit 6" (Apple Inc) [Retrieved from: https://developer.apple.com/augmented-reality/arkit/] (4 pages).

Anonymous , "Boundless XR and cloud gaming over 5G", Anonymous, "Boundless XR and cloud gaming over 5G," QCCOMResearch (2021) (33 pages).

Baroffio, Luca, et al., "Coding local and global binary visual features extracted from video sequences", Baroffio, et al. "Coding local and global binary visual features extracted from video sequences" in IEEE Transactions on Image Processing, vol. 24, No. 11, pp. 3546-3560, Nov. 2015, (https://ieeexplore.ieee.org/abstract/document/7122888).

Bastian, Matthias , "OpenXR aims to standardize "advanced haptics" for VR and AR", retrieved at https://mixed-news.com/en/openxr-aims-to-standardize-advanced-haptics-for-vr-and-ar/, Mar. 12, 2022.

Evans, Alun , et al., "A pipeline for the creation of progressively rendered web 3D scenes", Multimedia Tools and Applications, 2017, 1-28.

Kroon, Bart , "Call for MPEG immersive video test materials", retrieved at https://mpeg-miv.org/index.php/2022/05/11/call-for-mpeg-immersive-video-test-materials/, May 11, 2022.

Lavoue, Guillaume , et al., "Streaming Compressed 3D Data on the Web using JavaScript and WebGL", In: Proceedings of the 18th international conference on 3D web technology. ACM, 2013, 19-27.

Li, Guangqiang , et al., "A deep-learning real-time visual SLAM system based on multi-task feature extraction network and self-supervised feature points", Li, et al. "A deep-learning real-time visual SLAM system based on multi-task feature extraction network and self-supervised feature points" (Jan. 2021) (https://www.sciencedirect.com/science/article/abs/pii/S0263224120309374).

(56) References Cited

OTHER PUBLICATIONS

Ma, Jiayi , et al., "Image Matching from Handcrafted to Deep Features: A Survey", Ma, et al. Image Matching from Handcrafted to Deep Features: A Survey. Int J Comput Vis 129, 23-79 (2021). https://doi.org/10.1007/s11263-020-01359-2 (167 pages).

Mehrabi, Abbas , et al., "Multi-Tier CloudVR: Leveraging Edge Computing in Remote Rendered Virtual Reality", Mehrabi, et al. "Multi-Tier CloudVR: Leveraging Edge Computing in Remote Rendered Virtual Reality" ACM Transactions on Multimedia Computing, Communications, and Applications vol. 17 Issue 2 Article No. 49 pp. 1-24 (https://doi.org/10.1145/3429441).

Qu , et al., "A Comprehensive Review of Machine Learning in Multi-objective Optimization", Q. Qu, Z. Ma, A. Clausen and B. N. Jørgensen, "A Comprehensive Review of Machine Learning in Multi-objective Optimization," (2021 IEEE 4th International Conference on Big Data and Artificial Intelligence) (BDAI), (Qingdao, China), (2021, pp. 7-14).

Salisbury, Kenneth , et al., "Haptic Rendering: Introductory Concepts", IEEE Computer Graphics and Applications, 2004, 24-32.

Verschoor, M. , et al., "Tactile Rendering Based on Skin Stress Optimization", ACM Trans. Graph., vol. 39, No. 4, 2020, 1-13.

Zampoglou, Markos , et al., "Adaptive streaming of complex Web 3D scenes based on the MPEG-DASH standard", Multimedia Tools and Applications, 77.1, 2016, 125-148.

U.S. Appl. No. 18/214,279, filed Jun. 26, 2023, Tatu V.J. Harviainen.

U.S. Appl. No. 18/214,283, filed Jun. 26, 2023, Tatu V.J. Harviainen.

U.S. Appl. No. 18/234,548, filed Aug. 16, 2023, Tatu V.J. Harviainen.

U.S. Appl. No. 18/518,017, filed Nov. 22, 2023, Tatu V.J. Harviainen.

U.S. Appl. No. 19/322,436, filed Sep. 8, 2025, Tatu V.J. Harviainen.

* cited by examiner

Figure 7:
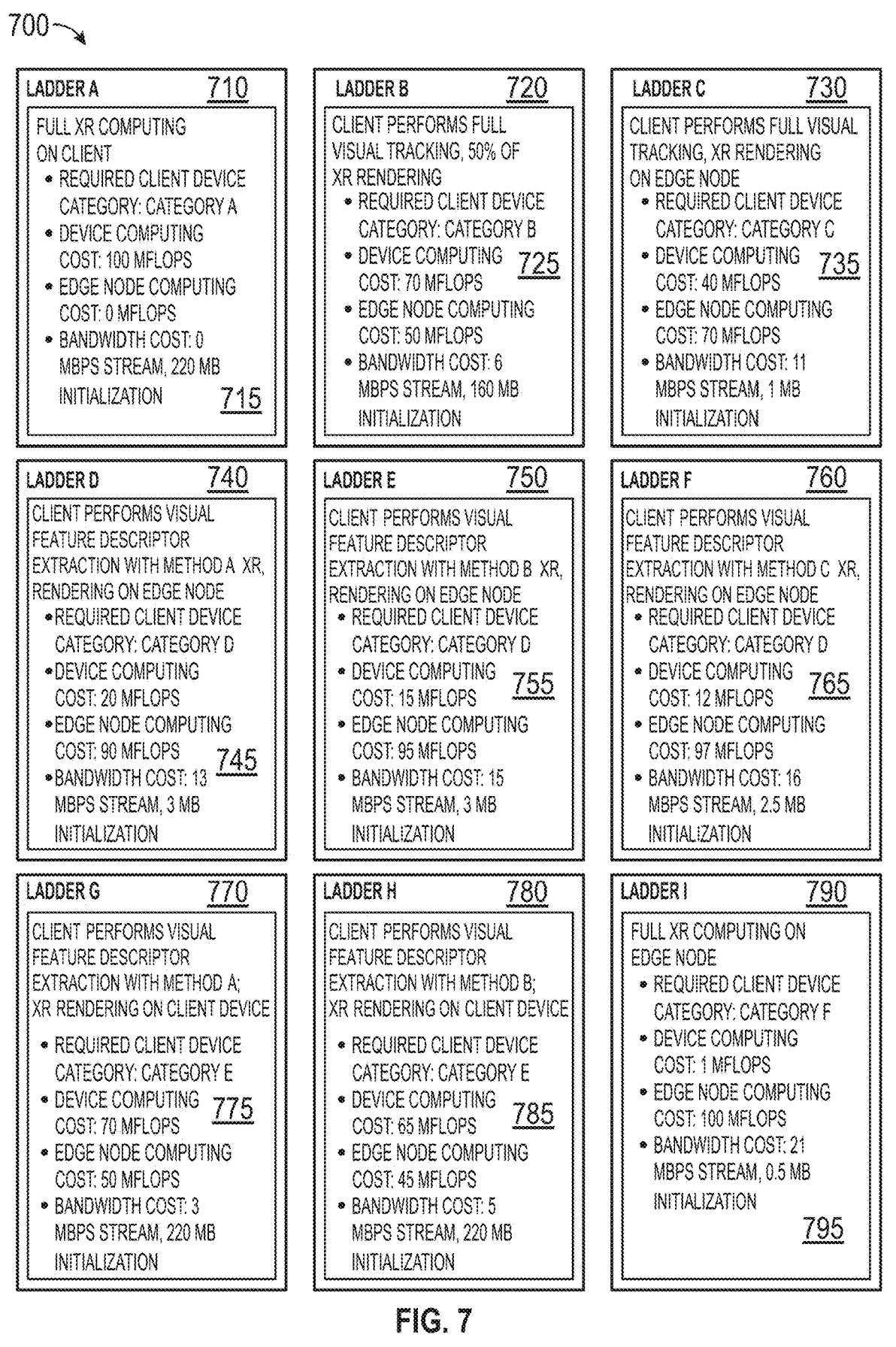

700

LADDER A    <u>710</u>

FULL XR COMPUTING
ON CLIENT
- REQUIRED CLIENT DEVICE
  CATEGORY: CATEGORY A
- DEVICE COMPUTING
  COST: 100 MFLOPS
- EDGE NODE COMPUTING
  COST: 0 MFLOPS
- BANDWIDTH COST: 0
  MBPS STREAM, 220 MB
  INITIALIZATION    <u>715</u>

LADDER B    <u>720</u>

CLIENT PERFORMS FULL
VISUAL TRACKING, 50% OF
XR RENDERING
- REQUIRED CLIENT DEVICE
  CATEGORY: CATEGORY B
- DEVICE COMPUTING   <u>725</u>
  COST: 70 MFLOPS
- EDGE NODE COMPUTING
  COST: 50 MFLOPS
- BANDWIDTH COST: 6
  MBPS STREAM, 160 MB
  INITIALIZATION

LADDER C    <u>730</u>

CLIENT PERFORMS FULL VISUAL
TRACKING, XR RENDERING
ON EDGE NODE
- REQUIRED CLIENT DEVICE
  CATEGORY: CATEGORY C
- DEVICE COMPUTING   <u>735</u>
  COST: 40 MFLOPS
- EDGE NODE COMPUTING
  COST: 70 MFLOPS
- BANDWIDTH COST: 11
  MBPS STREAM, 1 MB
  INITIALIZATION

LADDER D    <u>740</u>

CLIENT PERFORMS VISUAL
FEATURE DESCRIPTOR
EXTRACTION WITH METHOD A  XR,
RENDERING ON EDGE NODE
- REQUIRED CLIENT DEVICE
  CATEGORY: CATEGORY D
- DEVICE COMPUTING
  COST: 20 MFLOPS
- EDGE NODE COMPUTING
  COST: 90 MFLOPS   <u>745</u>
- BANDWIDTH COST: 13
  MBPS STREAM, 3 MB
  INITIALIZATION

LADDER E    <u>750</u>

CLIENT PERFORMS VISUAL
FEATURE DESCRIPTOR
EXTRACTION WITH METHOD B  XR,
RENDERING ON EDGE NODE
- REQUIRED CLIENT DEVICE
  CATEGORY: CATEGORY D
- DEVICE COMPUTING   <u>755</u>
  COST: 15 MFLOPS
- EDGE NODE COMPUTING
  COST: 95 MFLOPS
- BANDWIDTH COST: 15
  MBPS STREAM, 3 MB
  INITIALIZATION

LADDER F    <u>760</u>

CLIENT PERFORMS VISUAL
FEATURE DESCRIPTOR
EXTRACTION WITH METHOD C  XR,
RENDERING ON EDGE NODE
- REQUIRED CLIENT DEVICE
  CATEGORY: CATEGORY D
- DEVICE COMPUTING   <u>765</u>
  COST: 12 MFLOPS
- EDGE NODE COMPUTING
  COST: 97 MFLOPS
- BANDWIDTH COST: 16
  MBPS STREAM, 2.5 MB
  INITIALIZATION

LADDER G    <u>770</u>

CLIENT PERFORMS VISUAL
FEATURE DESCRIPTOR
EXTRACTION WITH METHOD A;
XR RENDERING ON CLIENT DEVICE

- REQUIRED CLIENT DEVICE
  CATEGORY: CATEGORY E
- DEVICE COMPUTING   <u>775</u>
  COST: 70 MFLOPS
- EDGE NODE COMPUTING
  COST: 50 MFLOPS
- BANDWIDTH COST: 3
  MBPS STREAM, 220 MB
  INITIALIZATION

LADDER H    <u>780</u>

CLIENT PERFORMS VISUAL
FEATURE DESCRIPTOR
EXTRACTION WITH METHOD B;
XR RENDERING ON CLIENT DEVICE

- REQUIRED CLIENT DEVICE
  CATEGORY: CATEGORY E
- DEVICE COMPUTING   <u>785</u>
  COST: 65 MFLOPS
- EDGE NODE COMPUTING
  COST: 45 MFLOPS
- BANDWIDTH COST: 5
  MBPS STREAM, 220 MB
  INITIALIZATION

LADDER I    <u>790</u>

FULL XR COMPUTING ON
EDGE NODE
- REQUIRED CLIENT DEVICE
  CATEGORY: CATEGORY F
- DEVICE COMPUTING
  COST: 1 MFLOPS
- EDGE NODE COMPUTING
  COST: 100 MFLOPS
- BANDWIDTH COST: 21
  MBPS STREAM, 0.5 MB
  INITIALIZATION
     <u>795</u>

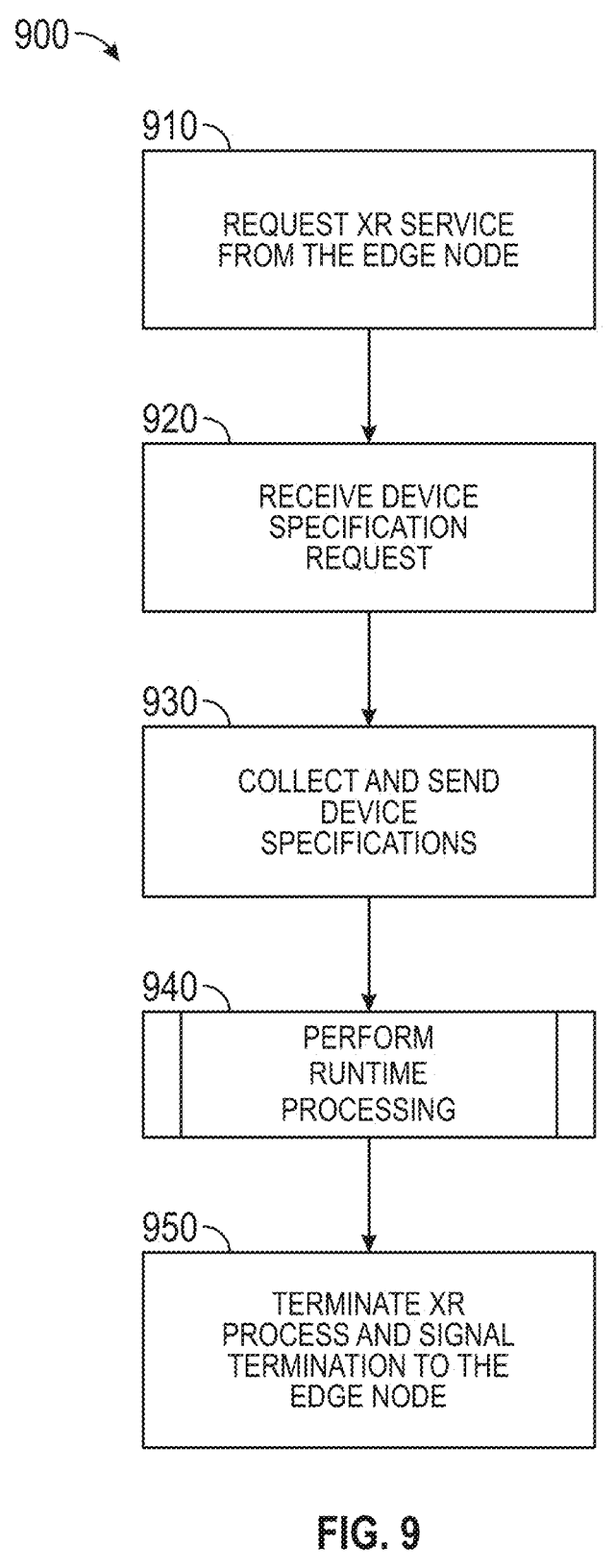

REQUEST XR SERVICE
FROM THE EDGE NODE

920

RECEIVE DEVICE
SPECIFICATION
REQUEST

930

COLLECT AND SEND
DEVICE
SPECIFICATIONS

940

PERFORM
RUNTIME
PROCESSING

950

TERMINATE XR
PROCESS AND SIGNAL
TERMINATION TO THE
EDGE NODE

FIG. 9

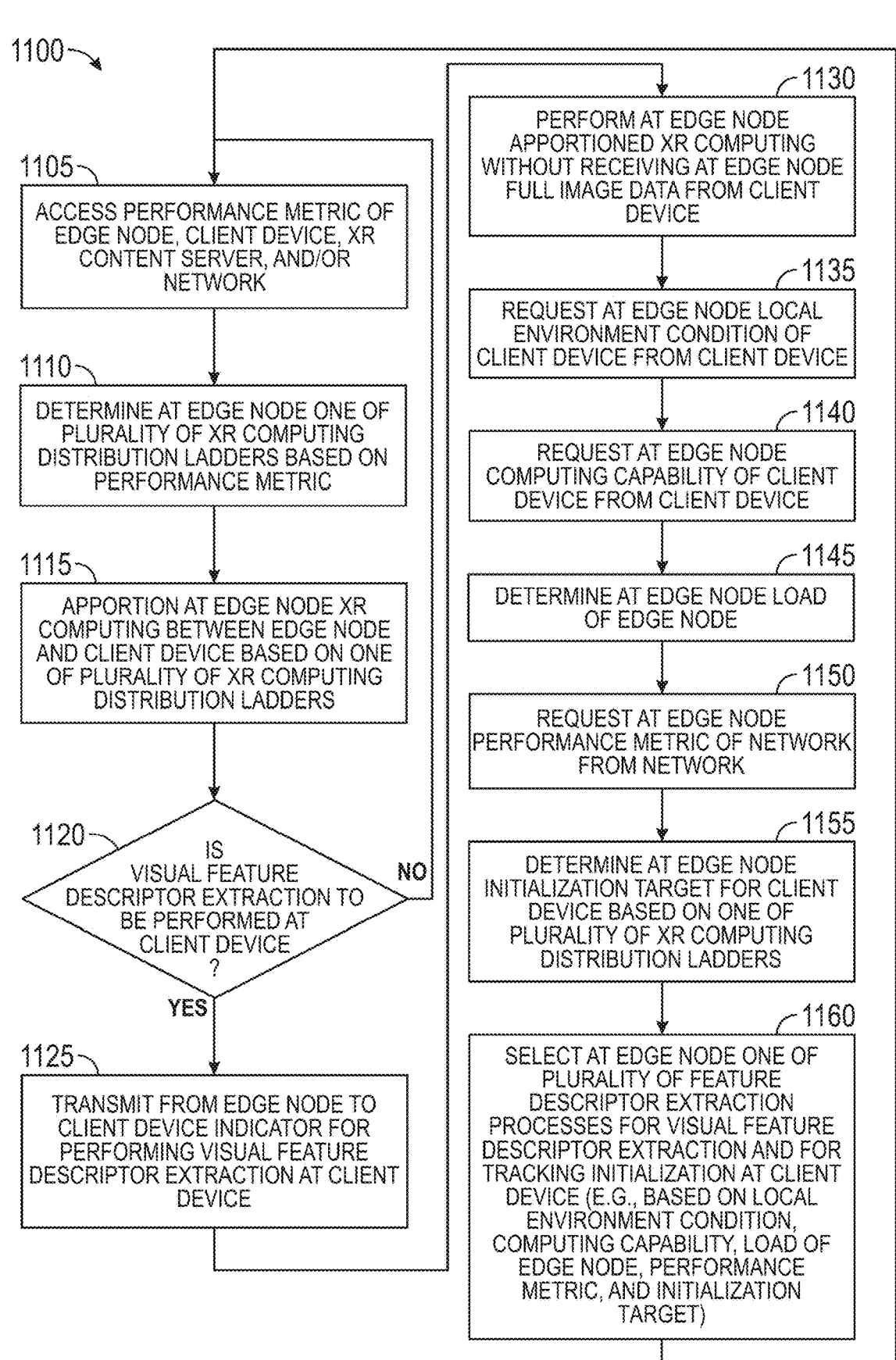

1100

1105

ACCESS PERFORMANCE METRIC OF EDGE NODE, CLIENT DEVICE, XR CONTENT SERVER, AND/OR NETWORK

1110

DETERMINE AT EDGE NODE ONE OF PLURALITY OF XR COMPUTING DISTRIBUTION LADDERS BASED ON PERFORMANCE METRIC

1115

APPORTION AT EDGE NODE XR COMPUTING BETWEEN EDGE NODE AND CLIENT DEVICE BASED ON ONE OF PLURALITY OF XR COMPUTING DISTRIBUTION LADDERS

1120

IS VISUAL FEATURE DESCRIPTOR EXTRACTION TO BE PERFORMED AT CLIENT DEVICE ?

NO

YES

1125

TRANSMIT FROM EDGE NODE TO CLIENT DEVICE INDICATOR FOR PERFORMING VISUAL FEATURE DESCRIPTOR EXTRACTION AT CLIENT DEVICE

1130

PERFORM AT EDGE NODE APPORTIONED XR COMPUTING WITHOUT RECEIVING AT EDGE NODE FULL IMAGE DATA FROM CLIENT DEVICE

1135

REQUEST AT EDGE NODE LOCAL ENVIRONMENT CONDITION OF CLIENT DEVICE FROM CLIENT DEVICE

1140

REQUEST AT EDGE NODE COMPUTING CAPABILITY OF CLIENT DEVICE FROM CLIENT DEVICE

1145

DETERMINE AT EDGE NODE LOAD OF EDGE NODE

1150

REQUEST AT EDGE NODE PERFORMANCE METRIC OF NETWORK FROM NETWORK

1155

DETERMINE AT EDGE NODE INITIALIZATION TARGET FOR CLIENT DEVICE BASED ON ONE OF PLURALITY OF XR COMPUTING DISTRIBUTION LADDERS

1160

SELECT AT EDGE NODE ONE OF PLURALITY OF FEATURE DESCRIPTOR EXTRACTION PROCESSES FOR VISUAL FEATURE DESCRIPTOR EXTRACTION AND FOR TRACKING INITIALIZATION AT CLIENT DEVICE (E.G., BASED ON LOCAL ENVIRONMENT CONDITION, COMPUTING CAPABILITY, LOAD OF EDGE NODE, PERFORMANCE METRIC, AND INITIALIZATION TARGET)

FIG. 11

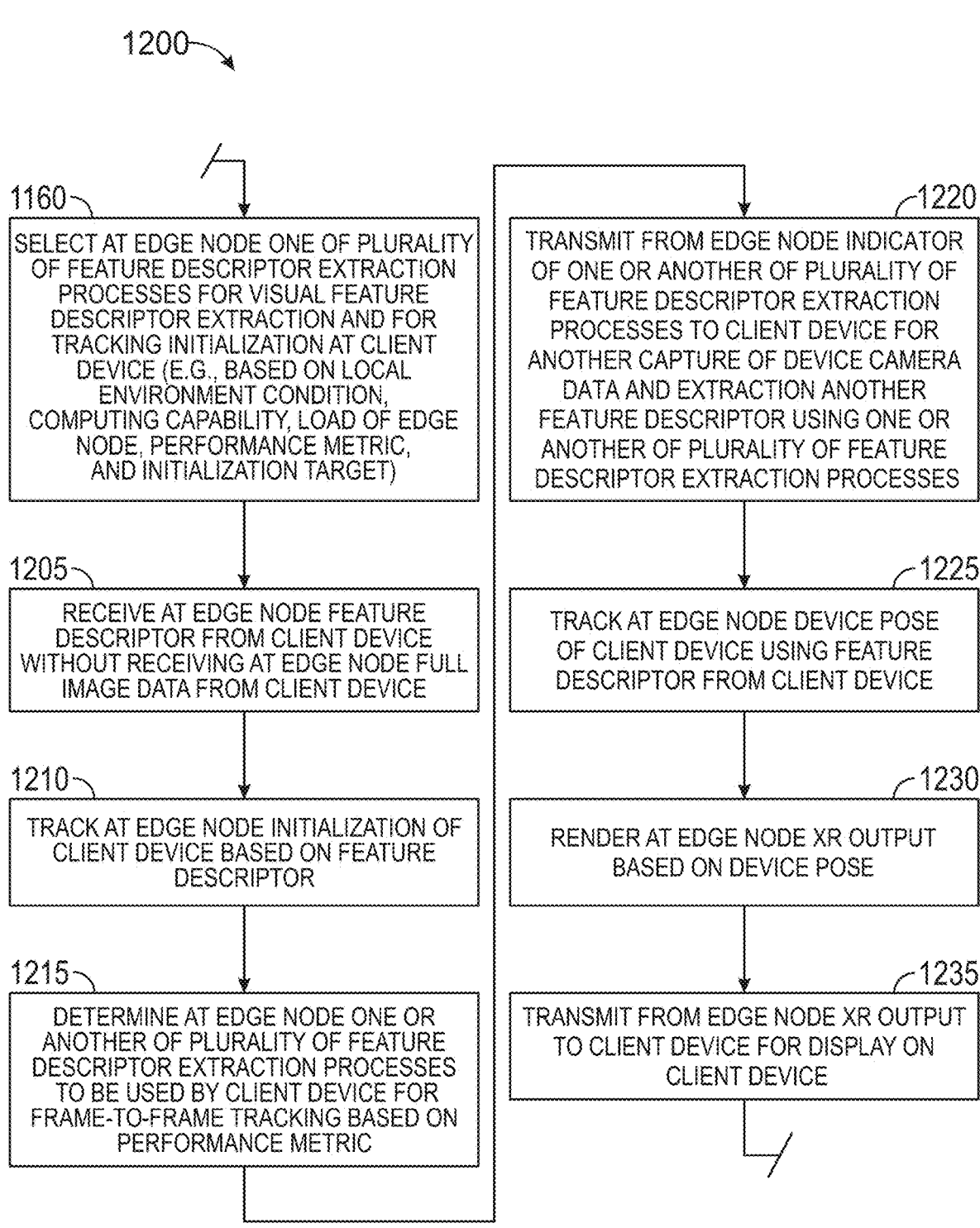

1200

1160
SELECT AT EDGE NODE ONE OF PLURALITY OF FEATURE DESCRIPTOR EXTRACTION PROCESSES FOR VISUAL FEATURE DESCRIPTOR EXTRACTION AND FOR TRACKING INITIALIZATION AT CLIENT DEVICE (E.G., BASED ON LOCAL ENVIRONMENT CONDITION, COMPUTING CAPABILITY, LOAD OF EDGE NODE, PERFORMANCE METRIC, AND INITIALIZATION TARGET)

1205
RECEIVE AT EDGE NODE FEATURE DESCRIPTOR FROM CLIENT DEVICE WITHOUT RECEIVING AT EDGE NODE FULL IMAGE DATA FROM CLIENT DEVICE

1210
TRACK AT EDGE NODE INITIALIZATION OF CLIENT DEVICE BASED ON FEATURE DESCRIPTOR

1215
DETERMINE AT EDGE NODE ONE OR ANOTHER OF PLURALITY OF FEATURE DESCRIPTOR EXTRACTION PROCESSES TO BE USED BY CLIENT DEVICE FOR FRAME-TO-FRAME TRACKING BASED ON PERFORMANCE METRIC

1220
TRANSMIT FROM EDGE NODE INDICATOR OF ONE OR ANOTHER OF PLURALITY OF FEATURE DESCRIPTOR EXTRACTION PROCESSES TO CLIENT DEVICE FOR ANOTHER CAPTURE OF DEVICE CAMERA DATA AND EXTRACTION ANOTHER FEATURE DESCRIPTOR USING ONE OR ANOTHER OF PLURALITY OF FEATURE DESCRIPTOR EXTRACTION PROCESSES

1225
TRACK AT EDGE NODE DEVICE POSE OF CLIENT DEVICE USING FEATURE DESCRIPTOR FROM CLIENT DEVICE

1230
RENDER AT EDGE NODE XR OUTPUT BASED ON DEVICE POSE

1235
TRANSMIT FROM EDGE NODE XR OUTPUT TO CLIENT DEVICE FOR DISPLAY ON CLIENT DEVICE

FIG. 12

1300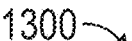

1305 —
RECEIVE AT EDGE NODE REQUEST FOR XR SERVICE FROM CLIENT DEVICE

1310 —
TRANSMIT FROM EDGE NODE REQUEST FOR XR EXECUTABLE AND XR CONTENT TO XR CONTENT SERVER

1315 —
RECEIVE AT EDGE NODE XR EXECUTABLE AND XR CONTENT FROM XR CONTENT SERVER

1320 —
INITIALIZE AT EDGE NODE XR APPLICATION

1325 —
TRANSMIT FROM EDGE NODE REQUEST FOR DEVICE SPECIFICATION TO CLIENT DEVICE

1330 —
RECEIVE AT EDGE NODE DEVICE SPECIFICATION FROM CLIENT DEVICE

1110 —
DETERMINE AT EDGE NODE ONE OF PLURALITY OF XR COMPUTING DISTRIBUTION LADDERS BASED ON PERFORMANCE METRIC

FIG. 13

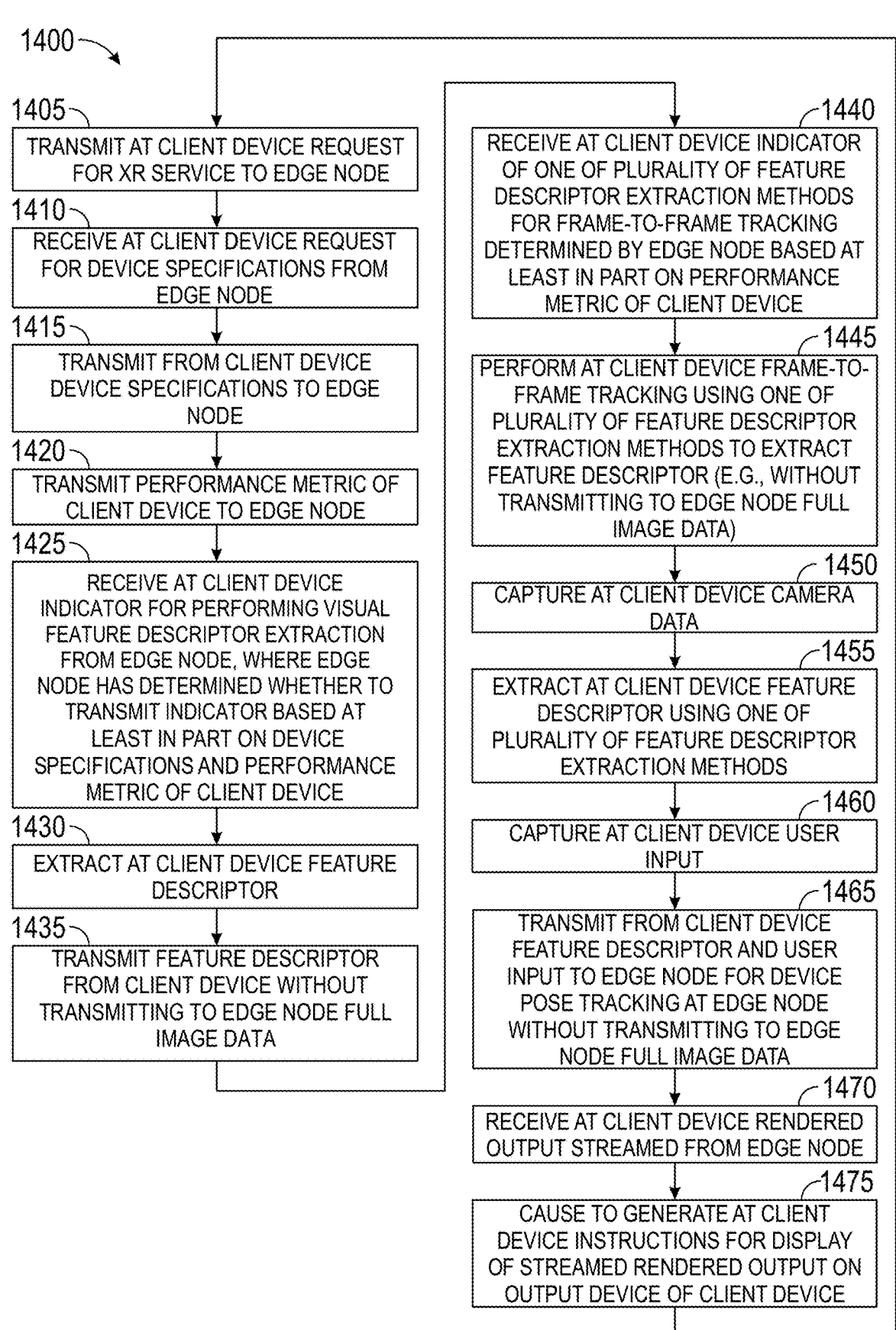

1400

1405
TRANSMIT AT CLIENT DEVICE REQUEST FOR XR SERVICE TO EDGE NODE

1410
RECEIVE AT CLIENT DEVICE REQUEST FOR DEVICE SPECIFICATIONS FROM EDGE NODE

1415
TRANSMIT FROM CLIENT DEVICE DEVICE SPECIFICATIONS TO EDGE NODE

1420
TRANSMIT PERFORMANCE METRIC OF CLIENT DEVICE TO EDGE NODE

1425
RECEIVE AT CLIENT DEVICE INDICATOR FOR PERFORMING VISUAL FEATURE DESCRIPTOR EXTRACTION FROM EDGE NODE, WHERE EDGE NODE HAS DETERMINED WHETHER TO TRANSMIT INDICATOR BASED AT LEAST IN PART ON DEVICE SPECIFICATIONS AND PERFORMANCE METRIC OF CLIENT DEVICE

1430
EXTRACT AT CLIENT DEVICE FEATURE DESCRIPTOR

1435
TRANSMIT FEATURE DESCRIPTOR FROM CLIENT DEVICE WITHOUT TRANSMITTING TO EDGE NODE FULL IMAGE DATA

1440
RECEIVE AT CLIENT DEVICE INDICATOR OF ONE OF PLURALITY OF FEATURE DESCRIPTOR EXTRACTION METHODS FOR FRAME-TO-FRAME TRACKING DETERMINED BY EDGE NODE BASED AT LEAST IN PART ON PERFORMANCE METRIC OF CLIENT DEVICE

1445
PERFORM AT CLIENT DEVICE FRAME-TO-FRAME TRACKING USING ONE OF PLURALITY OF FEATURE DESCRIPTOR EXTRACTION METHODS TO EXTRACT FEATURE DESCRIPTOR (E.G., WITHOUT TRANSMITTING TO EDGE NODE FULL IMAGE DATA)

1450
CAPTURE AT CLIENT DEVICE CAMERA DATA

1455
EXTRACT AT CLIENT DEVICE FEATURE DESCRIPTOR USING ONE OF PLURALITY OF FEATURE DESCRIPTOR EXTRACTION METHODS

1460
CAPTURE AT CLIENT DEVICE USER INPUT

1465
TRANSMIT FROM CLIENT DEVICE FEATURE DESCRIPTOR AND USER INPUT TO EDGE NODE FOR DEVICE POSE TRACKING AT EDGE NODE WITHOUT TRANSMITTING TO EDGE NODE FULL IMAGE DATA

1470
RECEIVE AT CLIENT DEVICE RENDERED OUTPUT STREAMED FROM EDGE NODE

1475
CAUSE TO GENERATE AT CLIENT DEVICE INSTRUCTIONS FOR DISPLAY OF STREAMED RENDERED OUTPUT ON OUTPUT DEVICE OF CLIENT DEVICE

FIG. 14

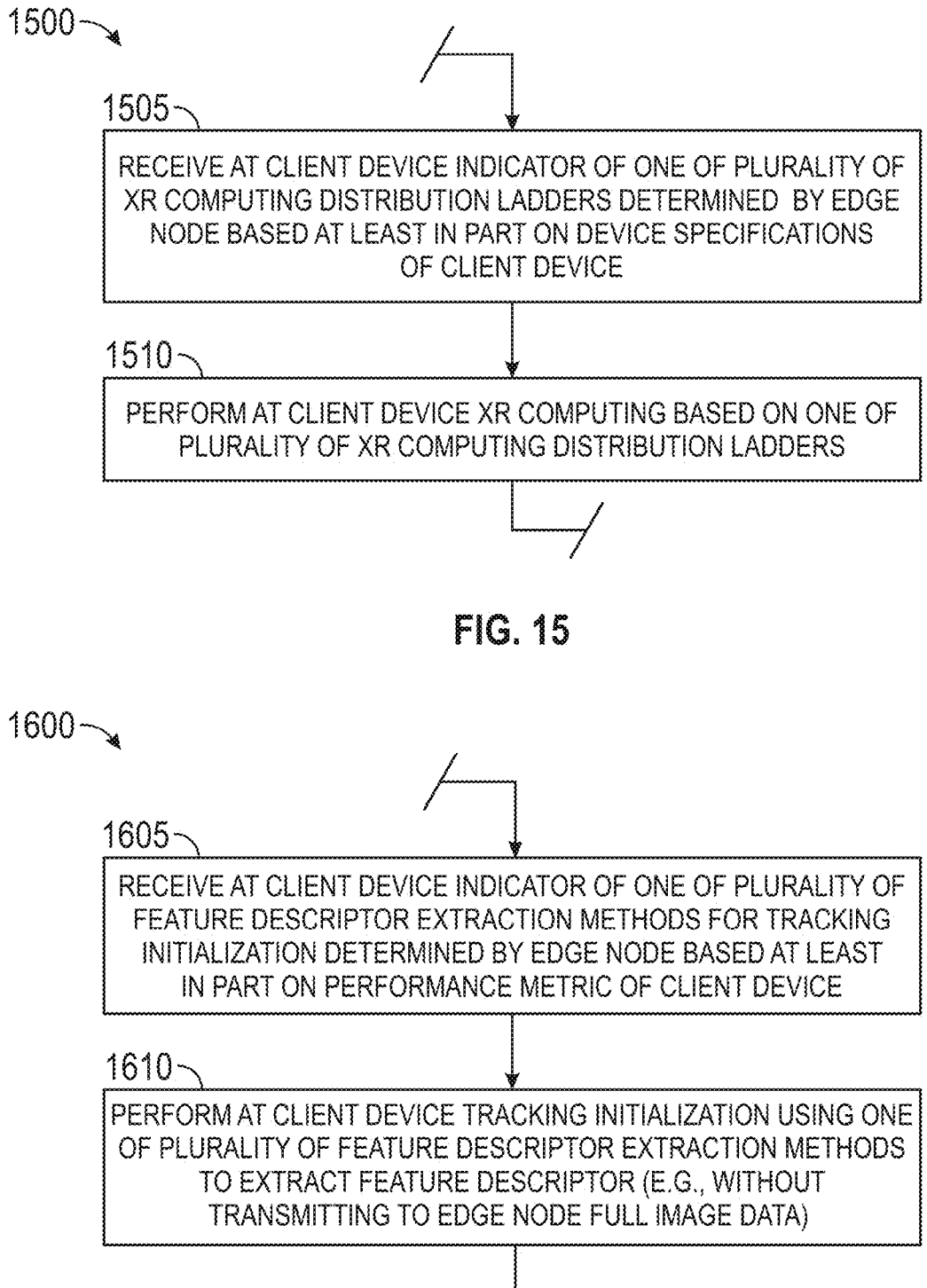

1500

1505

RECEIVE AT CLIENT DEVICE INDICATOR OF ONE OF PLURALITY OF XR COMPUTING DISTRIBUTION LADDERS DETERMINED BY EDGE NODE BASED AT LEAST IN PART ON DEVICE SPECIFICATIONS OF CLIENT DEVICE

1510

PERFORM AT CLIENT DEVICE XR COMPUTING BASED ON ONE OF PLURALITY OF XR COMPUTING DISTRIBUTION LADDERS

RECEIVE AT CLIENT DEVICE INDICATOR OF ONE OF PLURALITY OF FEATURE DESCRIPTOR EXTRACTION METHODS FOR TRACKING INITIALIZATION DETERMINED BY EDGE NODE BASED AT LEAST IN PART ON PERFORMANCE METRIC OF CLIENT DEVICE

1610

PERFORM AT CLIENT DEVICE TRACKING INITIALIZATION USING ONE OF PLURALITY OF FEATURE DESCRIPTOR EXTRACTION METHODS TO EXTRACT FEATURE DESCRIPTOR (E.G., WITHOUT TRANSMITTING TO EDGE NODE FULL IMAGE DATA)

DISTRIBUTED EXTENDED REALITY (XR) COMPUTING OPTIMIZATION AT CLIENT DEVICE IN COMMUNICATION WITH EDGE NODE

FIELD OF THE DISCLOSURE

The present disclosure relates to network distribution, network operation, extended reality (XR) technologies, edge nodes, client devices, content servers, and the like.

SUMMARY

In some approaches, rendering and streaming of XR experiences have problems maintaining low latency while offloading processing to a server side. Also, the approaches have encountered problems controlling visual tracking, initialization, device pose tracking, and rendering in a manner that ensures a seamless and enjoyable XR user experience.

Although performance of low latency networks is improving, for XR experiences, low latency is required to minimize a poor user experience. The approaches rely on a relatively "heavy" client device, i.e., a device with robust local processing capabilities, to avoid offloading of functions that might overtax a latency of the overall XR system. However, users increasingly desire "light" client devices, i.e., those with minimal local processing capabilities, which are unobtrusive and wearable during movement. These approaches fail to deliver a high-quality XR user experience on a light device.

XR streaming platforms such as Nvidia CloudXR™, Varjo Reality Cloud, Azure Remote Rendering, and Google Cloud's Immersive Stream™ for XR provide basic functionality for offloading XR rendering from a client side to a server side. Server side rendering is perceived to ease the computing requirements of the client device, allowing devices with limited graphics processing performance to offer rich XR experiences. Companies such as Nvidia, Meta, Google, and Varjo are developing services for XR streaming. However, using these approaches, XR processing offloading feasibility is limited by power consumption, computing performance of the edge computing node, data transmission bandwidth, and undesirably high latency between the client and the edge node. Thus, offloading of full XR processing to a centralized server is not feasible or desirable.

Regarding initialization, in some approaches, the most widely used AR platforms, i.e., ARCore™ and ARKit™, feature image marker-based initialization for registration. However, ARCore™ does not support some devices, particularly mobile devices. Also, ARCore™ is not particularly useful for iOS devices. ARKit™ also suffers from downsides. ARKit™ is only compatible with iOS platforms, and it has known backward compatibility issues.

Further, these AR platforms use simultaneous localization and mapping (SLAM) to provide device tracking when image markers are not visible for a device camera. However, SLAM is known to require relatively high computational complexity.

In another approach, simplified feature descriptor extraction is provided. From the image, a corner feature is detected and a circular area surrounding the detected feature is extracted to formulate a feature descriptor, which is visual data that is preferably invariant as to scale, transformation and rotation. Instead of transmitting full image data of all pixel values from the image, pixel values of, e.g., 16 pixels are required to be sent instead of full image data. However, such simplified feature descriptor extraction methods, known in the art as "hand-crafted" (i.e., present in the image itself) feature descriptors, are sensitive to sensor characteristics and changes in lighting condition. These and other limitations of hand-crafted feature descriptors lead to deformation of a scene.

In still another current approach, deep learning is applied to visual feature extraction. However, with such deep learning, real-time performance lags compared to traditional SLAM systems. A need for optimization of feature detection remains.

These and other limitations of these approaches are overcome with methods and systems provided herein for distributed XR computing optimization for an edge node connectable to a viewing client device and an XR content server across a network. Improvements to visual tracking, initialization, device pose tracking, and rendering deliver a high-quality XR user experience on a light client device with minimal latency.

An XR system is provided with an improved edge node. The edge node is configured to assess metrics of the XR system including a network connecting the edge node to an XR content server and to multiple XR client devices. Based on the metrics, the edge node determines an optimal XR computing distribution of processing functions, i.e., some functions are retained at the edge node, and others are sent to the client device. For example, during periods of high load on the edge node, client devices with sufficient local processing capabilities are instructed to take on functions that might otherwise be controlled at the edge. For relatively light client devices, offloading to the edge node is maximized and tracking is optimized, for example, by identification of a feature descriptor extraction method instead of full visual and device pose tracking at the client device. As a result, output is rendered at the client device in a manner that modulates in response to network conditions and takes into consideration the capabilities of the edge node and the various connected client devices. An improved XR experience is delivered to all connected client devices.

The present invention is not limited to the combination of the elements as listed herein and may be assembled in any combination of the elements described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, and in which:

FIG. 7 depicts a plurality of XR computing distribution ladders, in accordance with some embodiments of the disclosure;

FIG. 9 depicts a process for running an XR session at a client device, in accordance with some embodiments of the disclosure;

FIG. 11 depicts a process for an edge node, in accordance with some embodiments of the disclosure;

FIG. 12 depicts a subprocess for an edge node, in accordance with some embodiments of the disclosure;

FIG. 13 depicts another subprocess for an edge node, in accordance with some embodiments of the disclosure;

FIG. 14 depicts a process for a client device, in accordance with some embodiments of the disclosure;

FIG. 15 depicts a subprocess for a client device, in accordance with some embodiments of the disclosure;

FIG. 16 depicts another subprocess for a client device, in accordance with some embodiments of the disclosure;

Figure 1:
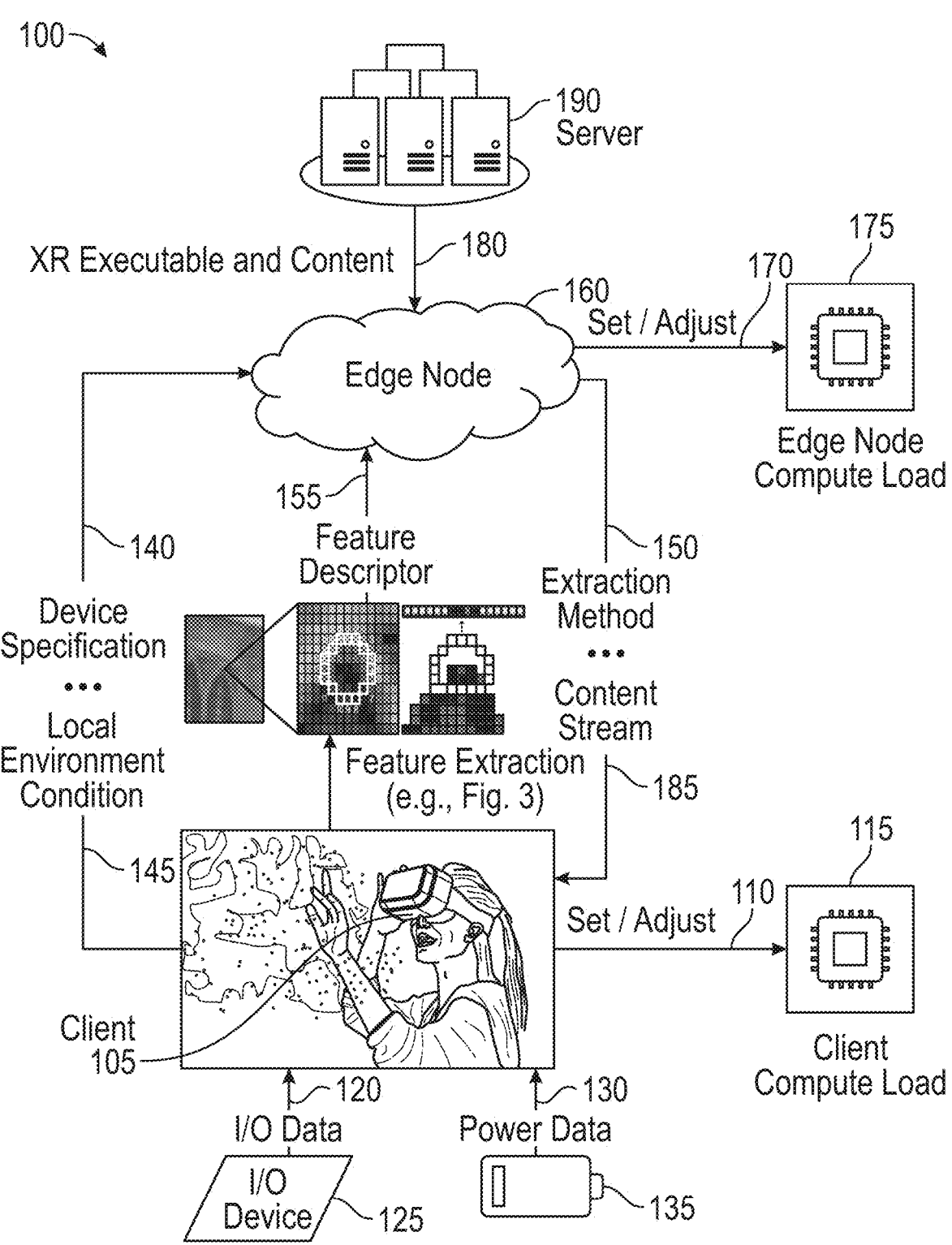
FIG. 1 depicts a system including a client device, an edge node, and a server, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Edge node computing and network resources are efficiently controlled and utilized. In response to an analysis of conditions of an edge node, client, and network, processing at the edge node and one or more client devices connected to the edge node are optimized. Computing and network resources are utilized as a collective system. Efficient resource sharing optimization is provided. Granular levels of controlling XR processing distribution are provided.

Edge computing controls a significant amount of processing that might otherwise be controlled by local clients. Edge computing allows relatively lightweight devices to operate as XR client devices for the full XR processing, including processing intensive tasks such as visual tracking for device pose estimation.

Edge computing is controlled to better accommodate relatively lightweight XR devices in a persistent manner. Relatively limited computing performance and power reserves are utilized at the client side to facilitate the relatively lightweight XR devices. Relatively heavy reliance on edge computing facilitates increasingly lightweight XR devices.

Shortcomings of approaches to streaming that focus on offloading rendering from a client device to a server side are overcome. XR requires computing in addition to rendering.

Rendering is processing intensive. In some embodiments, some or all rendering is offloaded from the client device to the edge node and/or the server.

Relatively lightweight XR head-mounted displays (HMDs) are provided that achieve advantages including consumer acceptance for use throughout the day, reduction of relatively bulky batteries, and reduction of relatively high-performance processing units from the client device side. Some or all of the processing intensive tasks are offloaded to the edge computing side.

Device tracking functions are provided for the relatively lightweight devices. User navigation within a virtual scene is provided. User navigation within the virtual scene with embodied motion is provided. Anchoring of virtual elements to a real physical world surrounding the user is provided.

Visual tracking methods used for XR include at least one of a marker-based tracking method, a model-based tracking method, a visual odometry-based tracking method, a SLAM-based tracking method, combinations of the same, or the like. Marker- and model-based approaches track known tracking targets relative to device camera coordinates. Visual odometry and SLAM-based methods provide relative camera motion and pose change from frame to frame in an uncontrolled environment. These methods provide the camera pose in an arbitrary local coordinate system. In some embodiments, these methods utilize a separate registration step to anchor the camera pose to a predefined coordinate system. For this kind of registration to a predefined coordinate system, markers, object recognition or some other localization methods are used in combination with visual odometry and SLAM. Additional tracking methods include at least one of an optical flow-based tracking method, a Kalman filtering-based tracking method, a meanshift and camshift tracking method, single object tracking, multiple object tracking, combinations of the same, or the like.

Initialization utilizes visual similarity matching to detect visual marker and/or known environment features. Visual similarity used for initialization involves extraction of visual feature descriptors from camera data. Visual feature descriptors for visual similarity differ from those utilized for actual tracking of camera motion from frame to frame. In some embodiments, different types of visual feature descriptors and/or a different frame rate of visual feature descriptors are extracted for visual similarity.

Edge computing operating in a local environment is configured with information regarding a local environment. In some embodiments, one of a plurality of visual feature descriptor extraction methods is selected based on the local environment conditions. The plurality of visual feature descriptor extraction methods includes at least one of scale-invariant feature transform (SIFT), speeded up robust features (SURF), features from accelerated segment test (FAST), binary robust invariant scalable key points (BRISK), binary robust independent elementary features (BRIEF), a lighter key point and descriptor extraction network (ALIKED), oriented FAST and rotated BRIEF (ORB), combinations of the same, or the like. SIFT is a method to detect and describe local features in images. SURF is a robust image descriptor that can be used in computer vision tasks like object recognition or 3D reconstruction. FAST is a corner detection method, which is used in computer vision tasks in some embodiments. BRISK is a fast method to detect and describe key points in an image. BRIEF is a feature descriptor, which does not provide any method to find the key points. ALIKED is a deep learning-based method for key point and descriptor extraction. ORB is a fast robust local feature detector. In some embodiments, a machine learning-based visual extraction method is trained to provide relatively high performance for the local environment conditions.

In the fields of network distribution and operation, techniques and standards for inter-device communication at a distance are provided. The techniques and standards include at least one of data over cable service interface specification (DOCSIS), internet protocol television (IPTV), over the top (OTT) delivery, cellular systems, network access systems, network quality of service (QOS), edge computing, broadcast systems, advanced television systems committee 3.0 (ATSC 3.0) standards, combinations of the same, or the like. The techniques and standards are improved in some embodiments as detailed herein.

In some embodiments, content is delivered in an XR environment. The XR environment includes XR sessions including at least one of augmented reality (AR), three-dimensional (3D) content, four-dimensional (4D) experiences, next-generation user interfaces (next-gen UIs), virtual reality (VR), mixed reality (MR), interactive experiences, avatars, 360° video, volumetric video, light field content, combinations of the same, or the like. Content for the XR sessions is captured, processed, and delivered in some embodiments. The XR environment is improved in some embodiments as detailed herein.

In some embodiments, processing resources, power consumption, and network bandwidth are optimized as a collective system. The collective system includes an edge node and one or more client XR devices connected to the edge node. XR computing distribution is optimized. The optimization is based on adapting visual tracking and XR rendering functions for the XR computing. The processing distribution between the edge node and the one or more client XR devices is provided on a granular level. The granularity is provided, in some embodiments, by using a selected one of a plurality of visual feature descriptor extraction methods for controlling a work division between the edge node and the one or more client XR devices.

When the visual feature descriptors are extracted from camera data by the client device, the required data transmission for visual tracking offloading is reduced, because the client sends the visual feature descriptor instead of full camera data. Also, when the client device performs first steps of the visual tracking by extracting the visual feature descriptors from the full camera data, demand for computing performance of the edge node is reduced. Relatively lightweight client devices that are not configured to execute full XR computing for visual tracking are viable with collective system.

U.S. patent application Ser. No. 18/214,278, titled "Systems and Methods for Adapting Content to the Haptic Capabilities of the Client Device," to Harviainen, filed Jun. 26, 2023, is hereby incorporated by reference herein in its entirety. U.S. patent application Ser. No. 18/214,283, titled "Systems and Methods for Balancing Haptics and Graphics Rendering Processing with Content Adaptation," to Harviainen et al., filed Jun. 26, 2023, is hereby incorporated by reference herein in its entirety. U.S. patent application Ser. No. 18/234,548, titled "Extended and Mixed Reality Experience Adaptation, Processing, and Handover from One Edge Node to Another," to Harviainen et al., filed Aug. 16, 2023, is hereby incorporated by reference herein in its entirety. The '278, '283, and '548 applications disclose offloading of XR computing to an edge node and balancing of compute resources. The '278 application discloses adapting XR content to match haptics feedback capabilities of a client device. The '283 application discloses the use of local computing resources of a client device by dynamically balancing computing used for haptics rendering and graphics rendering. The '548 application discloses seamless handover of edge computing from one edge node to another in cases where XR computing is offloaded from the client device to the edge node, and the edge node performs some content adaptation. In addition to the functionality of the '278, '283, and '548 applications, as noted herein, a potentially limited offloading capacity of an edge node is taken into consideration.

Computing resources are balanced due to the limited offloading capacity of an edge node. XR computing is distributed between one or more client devices and an edge node. Distributed computing occurs, in some embodiments, with relatively fine-grained sharing options between the edge node and the client. Balancing of computing is determined based on at least one of a computing load of the edge node, a computing load of one or more connected clients, a capacity of a network, a power reserve of the client device, a capacity of the client device, combinations of the same, or the like. The balancing of computing optimizes the XR computing for an entirety of a local edge node comprising an edge computing unit and multiple XR client devices connected to the edge node. In some embodiments, the edge node determines which one or more of the client devices is performing visual feature descriptor extraction from camera data by itself and what type of visual feature descriptor extraction method each client is using. In some embodiments, the edge node determines which visual feature descriptor extraction method is utilized. In some embodiments, the edge node determines a granularity of detail in the extracted descriptors requested by the edge node from the client. In some embodiments, the system is configured to provide a best possible accuracy based on environment characteristics. In some embodiments, the system is configured to adapt to available computing resources and available network capacity. Collective resources available from the edge node and all the connected XR clients are monitored. The collective resources available from the edge node and all the connected XR clients are continuously optimized. The collective resources available from the edge node and all the connected XR clients are dynamically adapted. Distribution of XR processing for all the XR clients is dynamically adapted during an ongoing XR session. In some embodiments, client devices are permitted to execute different XR applications. In some embodiments, client-to-client communication is not required.

Offloading of XR computing is performed on a per-client basis, with real-time rendering, and/or with low latency feedback from user input to a display update (low motion-to-photon latency). To ensure low latency, edge processing is performed for offloading some or all of the XR computing. In some embodiments, where XR processing is performed on the edge node, the edge node acquires and executes an XR application that executes necessary XR computing and rendering of a viewpoint based on device tracking. The edge node downloads the XR application and XR content to be executed from an XR content server, or the edge node retrieves XR content from a local cache if available. On the client device, dedicated viewing client software is executed. The dedicated viewing client software is configured to control communication with the XR application executed on the edge node. The viewing client is configured to perform at least one of capture of device sensor data and user input, communication with the edge node, performance of XR computing based on the edge node instructions, outputting XR view rendered and streamed by the edge node, combinations of the same, or the like.

FIG. 1 illustrates a system 100 for distributed XR computing optimization. The distributed XR computing optimization occurs between an edge node 160 and one or more connected XR client devices. For the sake of simplicity, only one client 105 is illustrated in FIG. 1. The system is configured for operation with a plurality of clients in some embodiments. In some embodiments, the system is configured for handoff from one edge node to another in accordance with U.S. patent application Ser. No. 18/234,548 to Harviainen et al., noted above.

The edge node 160 is configured to communicate with a server 190. The edge node 160 is configured to analyze information. Based on the analysis of the information, the edge node 160 is configured to decide an XR computing distribution for the client 105 and/or for the edge node 160. Control of the XR computing distribution includes, in some embodiments, setting and/or adjusting 110 a compute load 115 of the client 105, and setting and/or adjusting 170 a compute load 175 of the edge node 160.

The client 105 is configured with an input/output (I/O) device 125 and a power source 135. The client 105 is configured to collect I/O data 120 from the I/O device 125 and power data 130 from the power source 135. The I/O device 125 includes at least one of a position tracking device, an orientation tracking device, an inertial sensor, a motion-sensing controller, a gyrometer, an accelerometer, a proximity sensor, a geomagnetic sensor, a laser sensor, a voice control module, a camera, an eye tracking module, a head tracking module, a hand tracking module, an HMD, a projector unit, a light sensor, a display unit, a lens, an audio input unit, an audio output unit, a haptic feedback module, an input port, an output port, combinations of the same, or the like.

The client 105 is configured to transmit information to the edge node 160. The information includes at least one of the I/O data 120, the power data 130, a device specification 140, a local environment condition 145, combinations of the same, or the like.

The edge node 160 is configured to access and/or determine at least one of network performance, an initialization target, frame tracking, device pose tracking, rendering, combinations of the same, or the like.

The setting and/or adjusting 110 of the compute load 115 of the client 105 and the setting and/or adjusting 170 of the compute load 175 of the edge node 160 are based on analysis of at least one of the I/O data 120, the power data 130, the device specification 140, the local environment condition 145, the network performance, the initialization target, the frame tracking, the device pose tracking, the rendering, combinations of the same, or the like. In some embodiments, based on the analysis, the XR computing distribution is controlled, i.e., the compute load 115 of the client 105 and the compute load 175 of the edge node 160 are set and/or adjusted.

In some embodiments, the edge node 160 is configured to determine a feature descriptor extraction method 150 and transmit the determined feature descriptor extraction method 150 to the client 105. The client 105 is configured to receive the feature descriptor extraction method 150 from the edge node 160 and perform feature extraction in accordance with the feature descriptor extraction method 150, which results in a feature descriptor 155. The client 105 is configured to transmit the feature descriptor 155 to the edge node 160. The edge node 160 is configured to track initialization based on the feature descriptor 155. The edge node 160 is configured to track device pose using the feature descriptor 155. The edge node 160 is configured to track initialization and/or device pose and the like without a need to receive full image data from the client device 105.

The edge node 160 is configured to receive an XR executable and content 180 from the server 190. The edge node 160 is configured to transmit a content stream 185 to the client 105.

Figure 2:
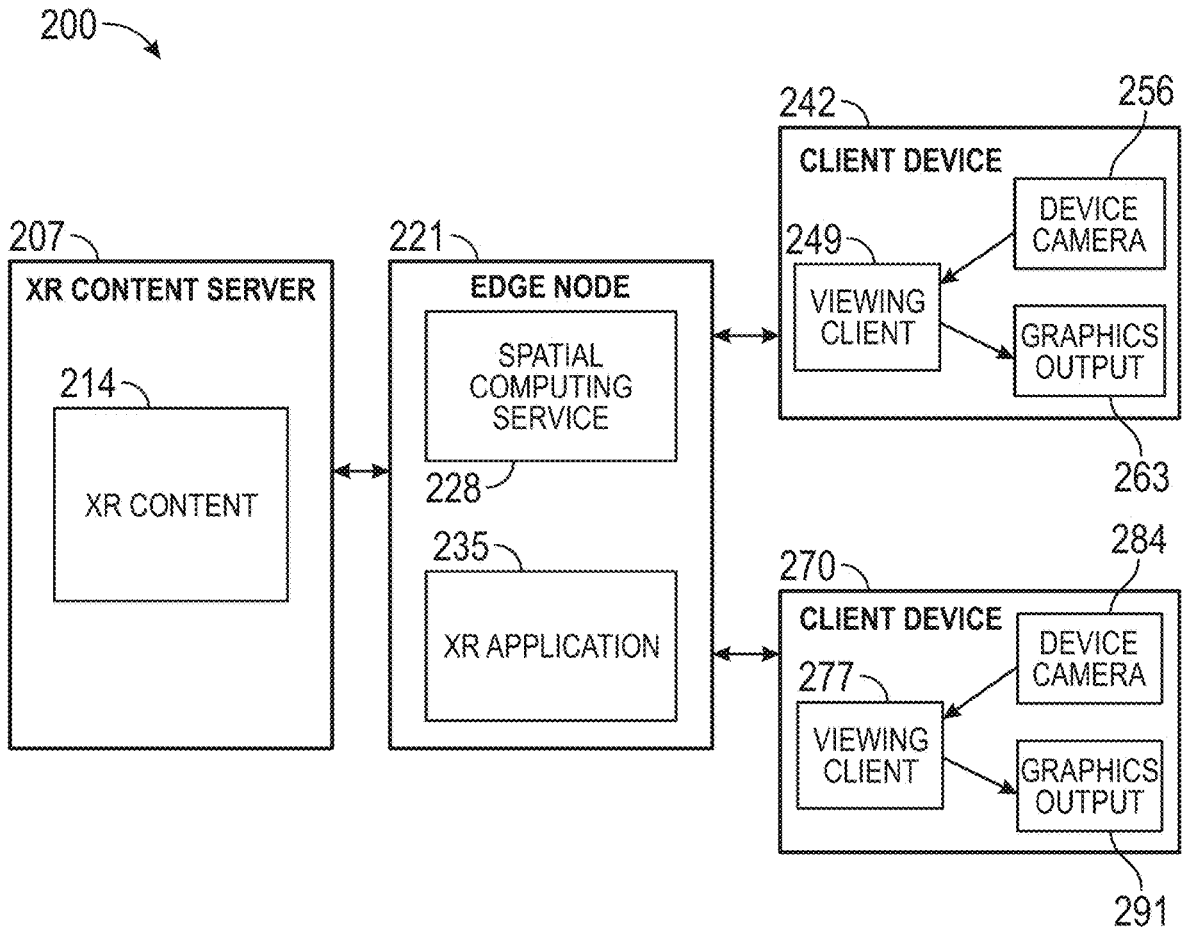
FIG. 2 depicts another system including client devices, an edge node, and an XR content server, in accordance with some embodiments of the disclosure.

FIG. 2 illustrates a system 200 for distributed XR computing optimization. The system 200 is configured to dynamically adapt XR computing distribution between a first client device 242, an n-th client device 270, and an edge node 221. The edge node 221 is configured to communicate to an XR content server 207. The edge node 221 is configured to communicate to the first client device 242, additional client devices (not shown), and the n-th client device 270. The dynamic adaptation of the XR computing distribution is a continuous process performed throughout an XR session, in some embodiments. The continuous adaptation process is described in detail herein.

In some embodiments, the XR content server 207 includes XR content 214. In some embodiments, the edge node 221 includes a spatial computing service 228 and an XR application 235. In some embodiments, the first client device 242 includes a viewing client 249, a device camera 256, and graphics output 263. The viewing client 249 is configured to receive data from the device camera 256 and to render and/or output the graphics output 263. In some embodiments, the n-th client device 270 includes a viewing client 277, a device camera 284, and graphics output 291. The viewing client 277 is configured to receive data from the device camera 284 and to render and/or output the graphics output 291.

Figure 3A:
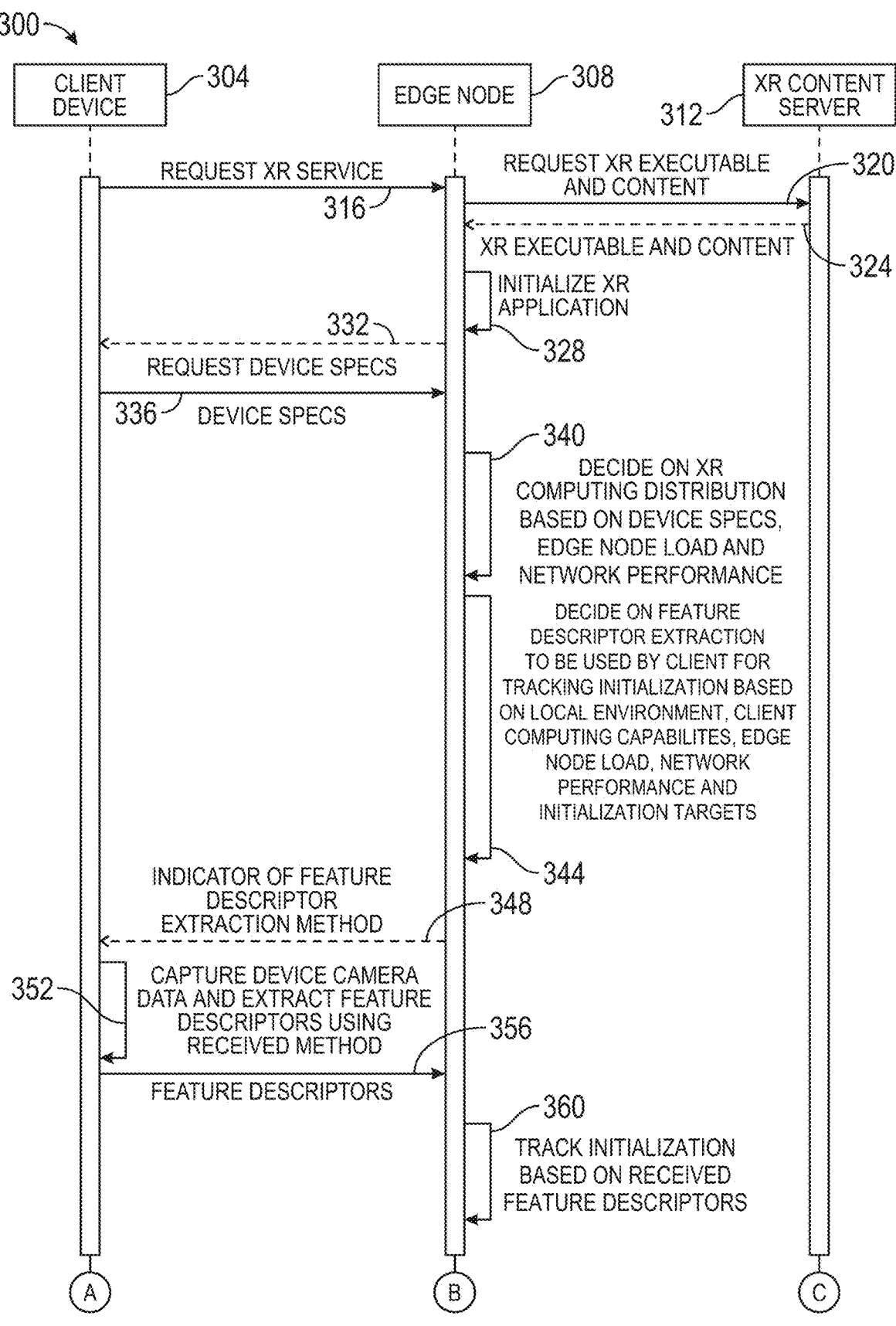
FIG. 3A and FIG. 3B depict a sequence diagram for a client device, an edge node, and an XR content server, in accordance with some embodiments of the disclosure.
Figure 3B:
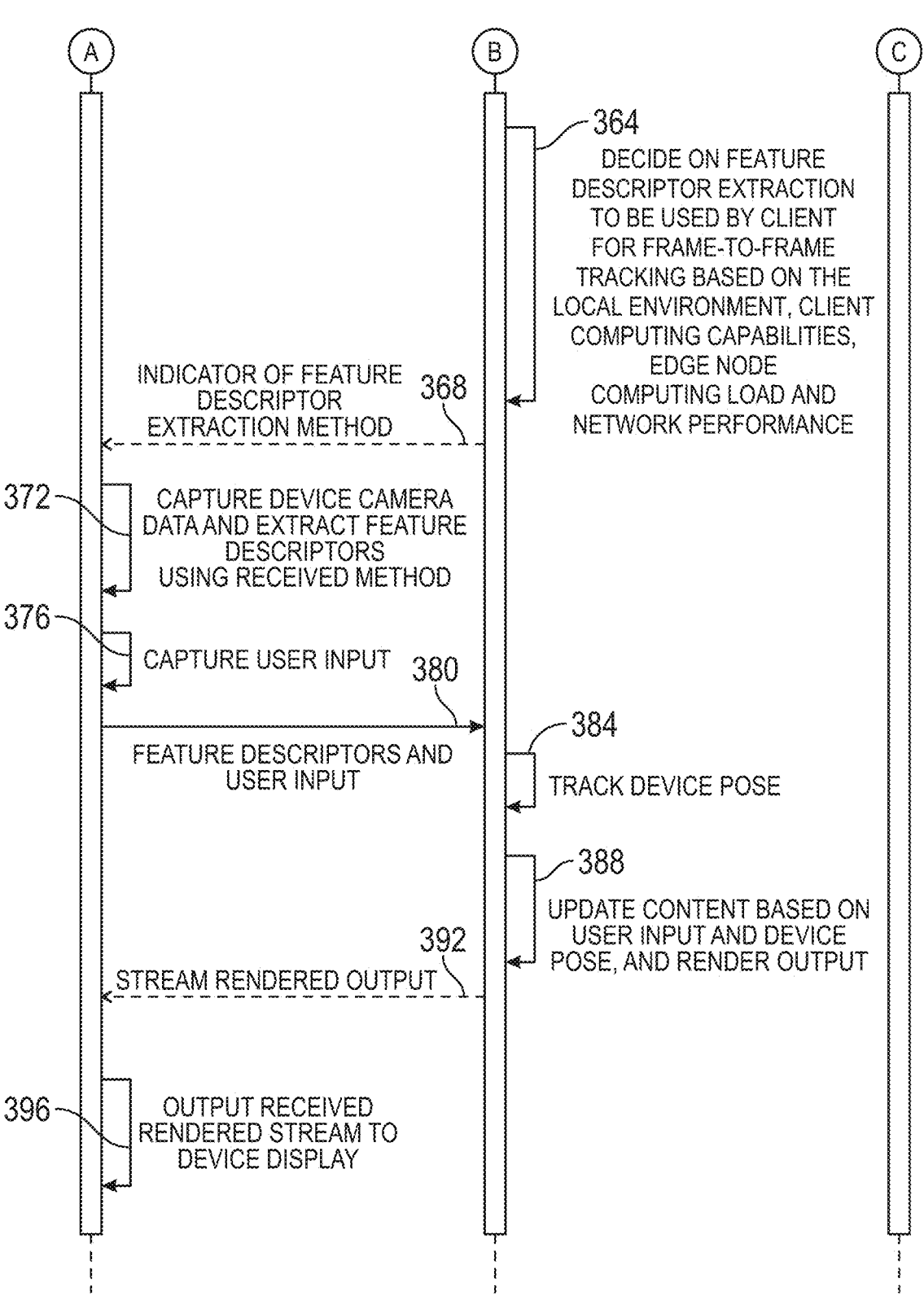

FIG. 3A and FIG. 3B illustrate a sequence diagram of communication and processing by and between a client device 304, an edge node 308, and an XR content server 312. Various processes for distributed XR computing optimization are provided. Some of the processes are provided from a perspective of the edge node 308. Others of the processes are provided from a perspective of the client device 304.

The edge node (e.g., 160, 221, 308) is, in some embodiments, a multi-access edge computing (MEC) server as defined for 5G networks. In some embodiments, the edge node is any server relatively close to the client device and serving as an edge processing node. The client is configured, in some embodiments, to connect to the edge node over a radio access network (RAN) in the case of 5G, or over a Wi-Fi connection.

A process 300 depicted by the sequence diagram includes a series of steps. Reading from the top to the bottom of FIG. 3A and FIG. 3B, in some embodiments, each step is performed in response to the previous step. Steps are repeated, duplicated, and/or omitted in some embodiments. Additional steps disclosed herein are included in some embodiments. Messages between entities are depicted as horizontal arrows with the name of the message superimposed above the arrows. Different types of arrows are used to represent different types of messages: solid arrow heads for synchronous calls, open arrow heads for asynchronous messages, and dashed lines for reply messages. When a synchronous message is sent by a sending entity, the sending entity waits until the message processing is complete, similar to a subroutine invocation. On the other hand, if an asynchronous message is sent, the sending entity proceeds with tasks without waiting for a response. Asynchronous calls are commonly found in multithreaded applications, event-driven applications, and message-oriented middleware.

The process 300 includes the client device 304 transmitting 316 a request for an XR service to the edge node 308, which receives the request. The edge node 308 transmits 320 a request for an XR executable and XR content to the XR content server 312, which receives the request. The XR content server 312 transmits 324 an XR executable and XR content to the edge node 308, which receives the XR executable and the XR content. The edge node 308 initializes 328 an XR application.

The edge node 308 transmits 332 a request for device specifications to the client device 304, which receives the request. The client device 304 transmits 336 device specifications to the edge node 308, which receives the device specifications.

The edge node 308 decides 340 on an XR computing distribution based on at least one of the device specifications, a load of the edge node 308, and a performance metric of a network connecting the client device 304 to the edge node 308, and/or a network connecting the edge node 308 to the XR server 312, combinations of the same, or the like. The edge node 308 decides 344 on a feature descriptor extraction method to be used by the client device 304 for tracking initialization based on at least one of the local environment, a computing capability of the client device 304, the load of the edge node 308, the performance metric of the network connecting the client device 304 to the edge node 308, and/or the network connecting the edge node 308 to the XR server 312, initialization targets, combinations of the same, or the like.

The edge node 308 transmits 348 an indicator of the feature descriptor extraction method decided by the edge node 308 to the client device 304, which receives the indicator. In some embodiments, the indicator is linked to a downloadable executable file. The client device 304 captures 352 device camera data and extracts one or more feature descriptors using the received feature descriptor extraction method. The client device 304 transmits 356 the one or more feature descriptors to the edge node 308, which receives the one or more feature descriptors.

The edge node 308 tracks 360 initialization based on the received one or more feature descriptors. The edge node 308 decides 364 on a feature descriptor extraction method (the same or a different one) to be used by the client device 304 for frame to frame tracking based on at least one of the local environment, a computing capability of the client device 304, the load of the edge node 308, and the performance metric of the network connecting the client device 304 to the edge node 308, and/or the network connecting the edge node 308 to the XR server 312, combinations of the same, or the like.

The edge node 308 transmits 368 an indicator of the feature descriptor extraction method (the same or the different one) decided by the edge node 308 to the client device

304, which receives the indicator. In some embodiments, the indicator is linked to a downloadable executable file. The client device 304 captures 372 device camera data and extracts one or more feature descriptors using the received feature descriptor extraction method (the same or the different one). The client device 304 captures 376 user input. The client device 304 transmits 380 the one or more feature descriptors and the user input to the edge node 308, which receives the one or more feature descriptors and the user input.

The edge node 308 tracks 384 a pose of the client device 304. The edge node 308 updates 388 content based on at least one of the user input, the device pose, combinations of the same, or the like. The edge node 308 renders output or transmits externally rendered output.

The edge node 308 transmits 392 a stream including the rendered output to the client device 304, which receives the stream including the rendered output. The client device 304 outputs 396 the received rendered stream to a display device of the client device 304. One or more steps of the process 300 repeat as needed.

Figure 4:
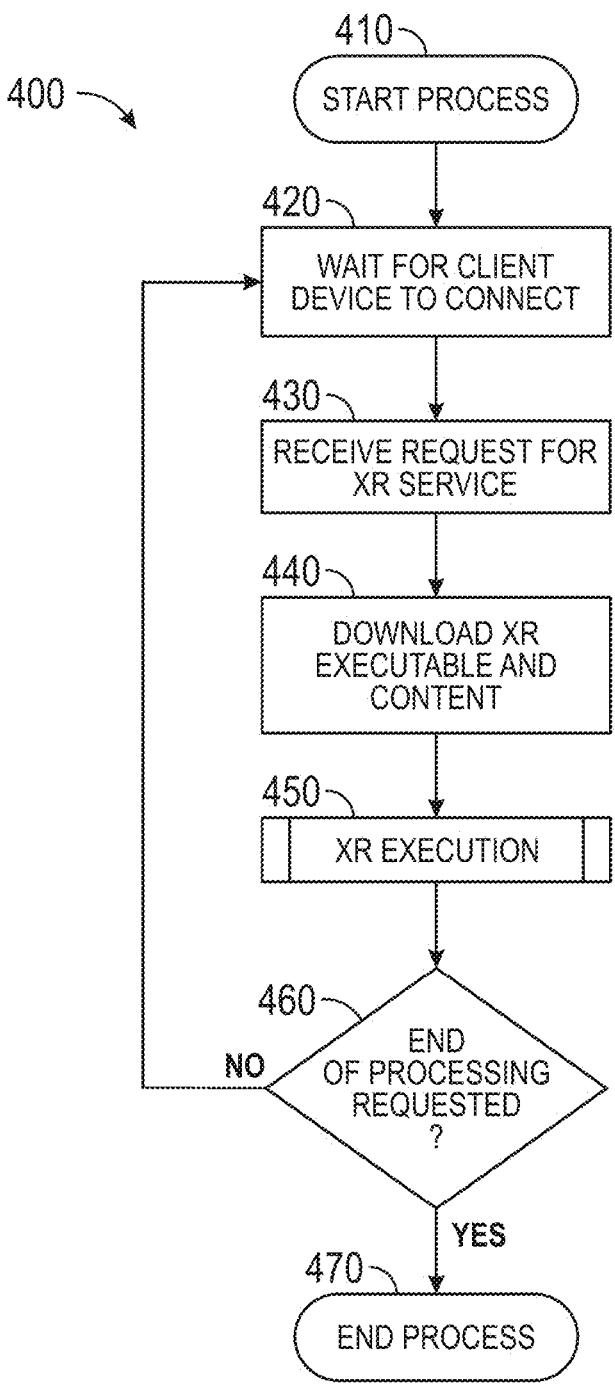
FIG. 4 is a flowchart of a process for XR offloading at an edge node, in accordance with some embodiments of the disclosure.

FIG. 4 is a flowchart of a process 400 executed by the edge node. The edge node offers XR offloading to the client devices that are connected to the edge node. The client device is configured to request an edge node to execute a specific XR application. The XR application to be executed is downloaded by the edge node from a network location or fetched from a cache. The process 400 includes starting 410 the process. The process 400 includes waiting 420 for the client device to connect. The process 400 includes receiving 430 a request for an XR service. The process 400 includes downloading 440 an XR executable and content. The process 400 includes XR execution 450. The process 400 includes determining 460 whether an end of processing is requested. In response to determining 460 the end of processing is not requested (460="No"), the process 400 returns to the waiting 420. In response to determining 460 the end of processing is requested (460="Yes"), the process 400 ends 470.

Figure 5:
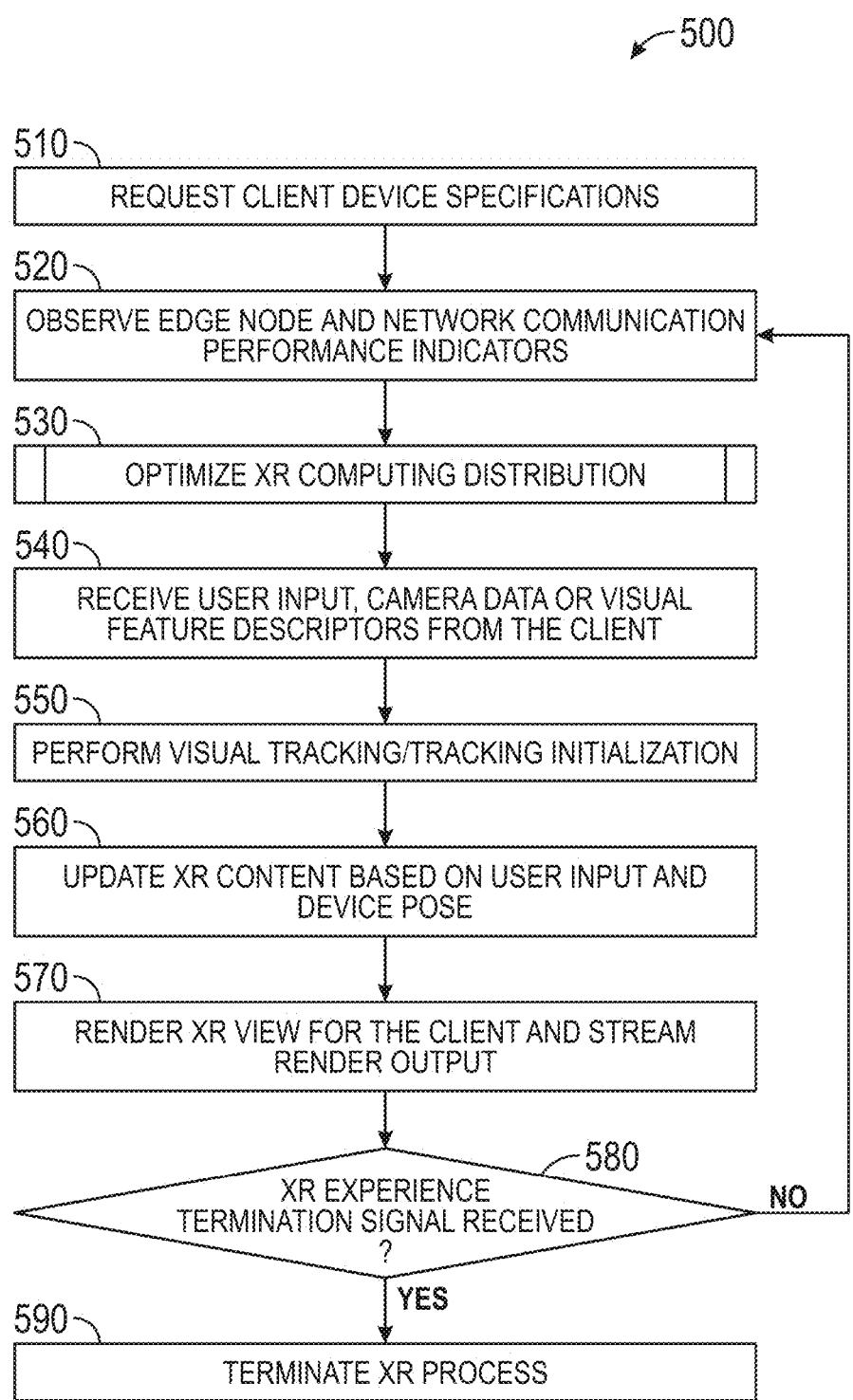
FIG. 5 is a flowchart of a process for launching and starting an XR executable at an edge node, in accordance with some embodiments of the disclosure.

Once the edge node has downloaded and installed the XR application based on the client device request, the edge node is configured to launch the executable and start an XR experience execution process 500 as illustrated in FIG. 5. The process 500 includes requesting 510 client device specifications. The process 500 includes observing 520 one or more edge node and network communication performance indicators. The process 500 includes optimizing 530 an XR computing distribution. The process 500 includes receiving 540, from the client, at least one of user input, camera data, visual feature descriptors, combinations of the same, or the like. The process 500 includes performing 550 at least one of visual tracking, tracking initialization, combinations of the same, or the like. The process 500 includes updating 560 XR content based on the user input, a pose of the device, combinations of the same, or the like. The process 500 includes rendering 570 an XR view for the client. The process 500 includes streaming rendered output. The process 500 includes determining 580 whether an XR experience termination signal is received. In response to determining 580 the XR experience termination signal is not received (580="No"), the process 500 returns to the observing 520. In response to determining 580 the XR experience termination signal is received (580="Yes"), the process 500 includes terminating 590 the XR process.

In the XR experience execution, the edge node first requests the client device specifications from the client. Client device specifications describe computing performance capabilities of the client device, and the edge node uses this information to determine at what level the client device can perform XR computing.

In some embodiments, the edge computing node runs a spatial computing server, which collects the data from the connected client device sensors and maintains a map of the edge node local environment. In some embodiments, when the edge node determines a level of XR processing to be performed by the client device, the edge node assesses a type of visual feature descriptor extraction method for use by the client. In some embodiments, the edge node, with assistance from the spatial computing server, is configured to determine which of the visual feature descriptor extraction methods is best suited for current environment conditions surrounding the client device. When using machine learning-based visual feature descriptor extraction methods, the visual feature descriptor extraction method to be used is trained to optimally perform in the local environment. Also, in some embodiments, machine learning-based deep feature extraction methods are trained to produce different visual feature descriptor densities and require different levels of processing by a computing unit. In some embodiments, a number of neural network layers is varied to achieve the different visual feature descriptor densities and the different levels of processing by the computing unit.

In some embodiments, deep learning is utilized for training neural network models. The neural network models are trained to learn visual features descriptors that optimally discriminate between corresponding and non-corresponding pixels. The discrimination is performed by using data sets featuring images of an environment from different viewpoints as training data. As these "deep" features are learned from the training data sets representing operational and/or use case-specific conditions, inferred deep features, i.e., learned visual feature descriptors, have optimized performance for a specific task. For edge computing, the client device is configured to perform visual tracking in a known environment. In some embodiments, the edge computing serves clients in a limited local environment.

In some embodiments, where edge computing is persistently serving client devices for XR computing, the XR application or spatial computing service running on the edge node continuously collects training data by storing sensor data received from the client devices. The collected sensor data is used to train deep features. Deep features are specifically trained to optimally operate in a whole environment. In some embodiments, deep features are optimized for smaller areas segmented from an entire area covered by the edge node. In some embodiments, in order to offer more refined ladders for the XR processing distribution, several deep feature types are trained that have varied computational cost. In some embodiments, the more refined ladders are achieved by producing feature descriptors at varying data density. In some embodiments, both deep feature types trained at varied computational cost and at varied data density are provided to refine the XR processing distribution ladders.

In some embodiments, the spatial computing service running on the edge node trains full end-to-end visual initialization. The full end-to-end visual initialization includes identifying a neural network. In some embodiments, at least a portion of visual feature descriptor extraction or an entirety of visual feature descriptor extraction is performed by the spatial computing service. The spatial computing service performs full feature matching for tracking initialization and/or for frame to frame pose estimation. In embodiments where the XR client is configured to perform full visual tracking on the client device, the edge node sends the trained end-to-end neural network to the client. The client performs tracking initialization without a need for delivering a feature set otherwise required for conventional initialization.

In embodiments utilizing a high-performance client device, the edge node instructs the client device to perform full XR computing and XR scene rendering locally on the device. In some embodiments, the edge node instructing the client device to perform the full XR computing and the XR scene rendering locally occurs in response determining that the edge node is operating under a significant computing load, for example, due to running other services and performing XR computing for other clients. In some embodiments, the client device signals the power reserve to minimize power consumption at the client side to achieve increased operational time. In some embodiments, the power reserve signal is sent to the client device in response to determining that the offloading of XR computing is preferred by the client device.

In a continuous XR execution loop, the edge node first observes the computing and network performance indicators of the edge node and optimizes the XR computing distribution based on the current performance. Details of the XR computing distribution optimization are described herein. Based on the XR computing distribution optimization, the edge node determines for each of the connected XR client devices if the client device is set to perform visual feature descriptor extraction and what method the client uses for the visual feature descriptor extraction. Once the edge node has set the XR computing distribution for the client devices, it will receive camera data or visual feature descriptors from the viewing clients together with the user input. Based on the received data, the edge node performs the visual tracking, updates the XR scene and renders the XR scene view for the viewing clients. The edge node streams the XR rendered output to the viewing clients and then proceeds to perform a next step of the XR execution by stepping back to observing performance indicators. This continuous XR execution loop is executed until an end of processing has been signaled, either by the viewing client, edge node, or the XR content server.

Ladders of XR computing distribution are provided. In some embodiments, in operation, a selection from among a plurality of ladders is made to achieve a distribution approach suitable for detected conditions. With the selection, distribution of the XR computing between the client and the edge node is optimized in a granular manner. In some embodiments, an option for XR computing distribution is extended, from a binary selection of either performing visual tracking and/or XR rendering entirely on the client device or entirely the edge node, to a relatively large selection of different ladders of distribution with various processing and communication bandwidth implications. In some embodiments, distribution is not adjusted by finding a right floating-point number for a distribution percentage, but rather with discrete steps formed by various distribution option ladders.

Figure 6:
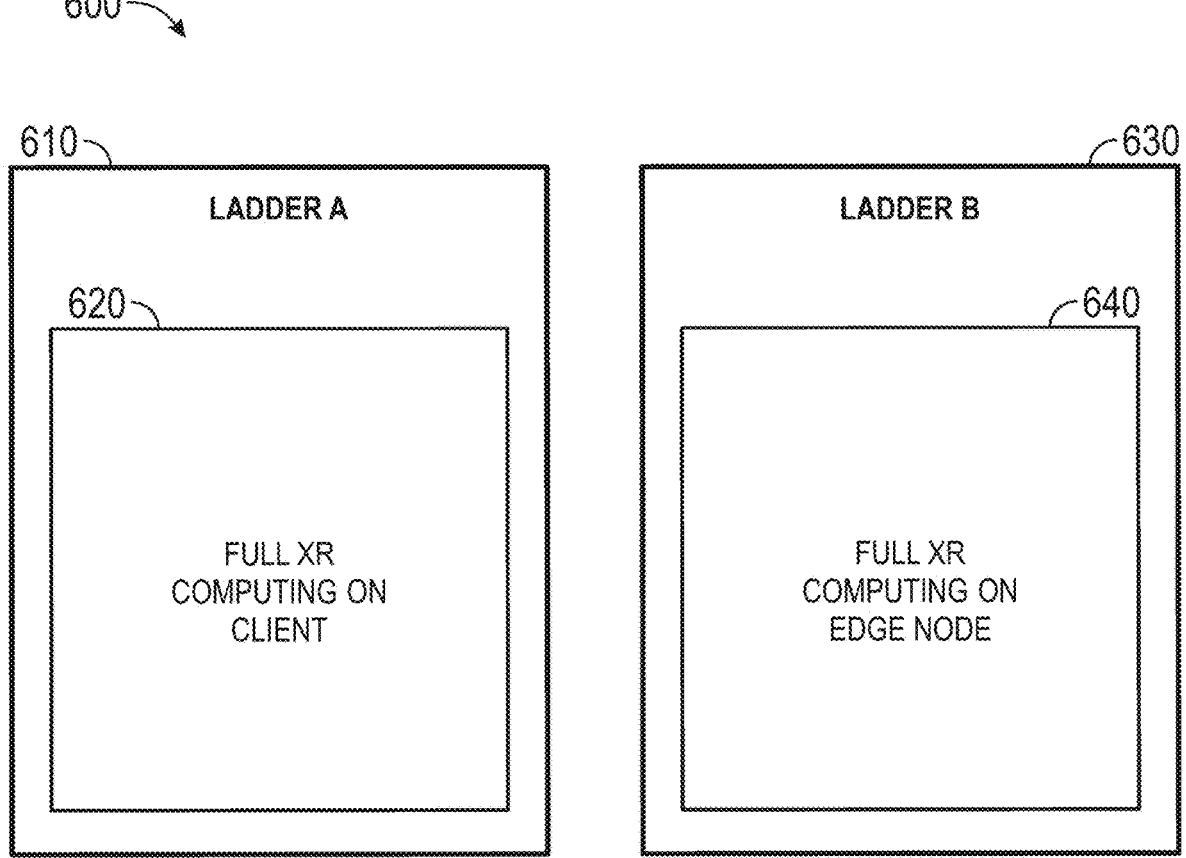
FIG. 6 depicts binary XR computing distribution ladders, in accordance with some embodiments of the disclosure.

FIG. 6 illustrates binary distribution option ladders. In some embodiments, a database 600 includes a Ladder A 610, which includes settings and/or instructions 620 for implementing full XR computing on the client; and a Ladder B 630, which includes settings and/or instructions 640 for implementing full XR computing on the edge node. In some embodiments, for example, the Ladder A 610 includes the exemplary processing specifications of Ladder A 710 described below, and the Ladder B 630 includes the exemplary processing specifications of Ladder I 790 described below.

FIG. 7 illustrates an exemplary set of fine granular distribution option ladders. In some embodiments, a database 700 includes at least one of a Ladder A 710, which includes settings and/or instructions 715 for implementing full XR computing on the client; a Ladder B 720, which includes settings and/or instructions 725 for implementing full visual tracking and about 50% XR rendering on the client; a Ladder C 730, which includes settings and/or instructions 735 for implementing full visual tracking on the client and full XR rendering on the edge node; a Ladder D 740, which includes settings and/or instructions 745 for implementing a visual tracking feature descriptor method A on the client and full XR rendering on the edge node; a Ladder E 750, which includes settings and/or instructions 755 for implementing a visual tracking feature descriptor method B on the client and full XR rendering on the client; a Ladder H 780, which includes settings and/or instructions 785 for implementing a visual tracking feature descriptor method B on the client and full XR rendering on the client; a Ladder I 790, which includes settings and/or instructions 795 for implementing full XR computing on the edge node; combinations of the same; or the like. In some embodiments, the database 700 includes each of the Ladders A-I 710-790. In some embodiments, each of the Ladders A-I 710-790 includes settings and/or instructions for a required client device category, a device computing cost, an edge node computing cost, a stream bandwidth cost, and an initialization bandwidth cost. In some embodiments, each of the Ladders A-I 710-790 includes settings and/or instructions for the required client device category, the device computing cost, the edge node computing cost, the stream bandwidth cost, and the initialization bandwidth cost in accordance with Table 1, as follows:

TABLE 1

Distribution Option Ladders with Computing and Bandwidth Costs

| Ladder | Client Compute Load | Edge Node Compute Load | Required client device category | Device computing cost (MFLOPS) | Edge node computing cost (MFLOPS) | Stream bandwidth cost (Mbps) | Initialization bandwidth cost (MB) |
|---|---|---|---|---|---|---|---|
| Ladder A 710 | Full XR computing | | A (heavy) | 100 | 0 | 0 | 220 |
| Ladder B 720 | Full visual tracking; about 50% of XR rendering | About 50% of XR rendering | B | 70 | 50 | 6 | 160 |
| Ladder C 730 | Full visual tracking | XR rendering | C | 40 | 70 | 11 | 1 |
| Ladder D 740 | Visual feature descriptor extraction Method A | XR rendering | D | 20 | 90 | 13 | 3 |
| Ladder E 750 | Visual feature descriptor extraction Method B | XR rendering | D | 15 | 95 | 15 | 3 |
| Ladder F 760 | Visual feature descriptor extraction Method C | XR rendering | D | 12 | 97 | 16 | 2.5 |
| Ladder G 770 | Visual feature descriptor extraction Method A; and XR rendering | | E | 70 | 50 | 3 | 220 |
| Ladder H 780 | Visual feature descriptor extraction Method B; and XR rendering | | E | 65 | 45 | 5 | 220 |
| Ladder I 790 | | Full XR computing | F (thin) | 1 | 100 | 21 | 0.5 | full XR rendering on the edge node; a Ladder F 760, which includes settings and/or instructions 765 for implementing a visual tracking feature descriptor method C on the client and full XR rendering on the edge node; a Ladder G 770, which includes settings and/or instructions 775 for implementing a visual tracking feature descriptor method A on the client and XR computing distribution optimization is provided. XR computing distribution optimization is a multi-objective optimization task, for which the edge node uses any applicable method. One goal of the optimization is to jointly optimize the use of collective computing resources, energy and network consumption, and communication latency across and between the edge node and all the connected client devices that are using the edge node for the XR computing offloading.

Optimization adjusts several parameters that are tuned for controlling the sharing of the load between different parts of the system. In some embodiments, the optimization is orchestrated by the edge node. The edge node is configured to command each viewing client connected to the edge node to perform full XR computing including at least one of view rendering, performing of full visual tracking, performing visual feature descriptor extraction, streaming device sensor data, combinations of the same, or the like. In some embodiments, the edge node controls at least one of a frame rate of the camera, data processing, a visual feature descriptor extraction method, combinations of the same, or the like. Both the frame rate and the visual feature descriptor extraction method have an impact on the required processing and network traffic. Different visual feature descriptor extraction methods have different computing performance costs. Both the method and minimum frame rate requirements vary between a visual tracking initialization phase and frame to frame run-time tracking. In addition to the tracking frame rate and the visual feature descriptor extraction method, in some embodiments, the edge node includes an option to set the edge node or the viewing client to execute the full tracking. In some embodiments, when the edge node is set to perform full tracking, the viewing client sends the full camera data to the edge node, and the edge node incurs the full computing load required for the visual tracking. In some embodiments, when the viewing client is set to perform the full visual tracking, the viewing client incurs the full computing load for the visual tracking. In some embodiments, when the viewing client is set to perform the full visual tracking, only the resulting pose from the visual tracking is sent from the viewing client to the edge node, which requires a smaller amount of network communication compared to the sending of full camera data or extracted visual feature descriptors.

In some embodiments, the system is configured to establish a specific ladder of such choices so that the edge node selects choices accordingly for each client device when conditions change over time. For instance, the ladder of choices may include a range of frame rates and visual descriptor extraction methods for various bandwidth conditions. The range of frame rates and visual descriptor extraction methods for various bandwidth conditions contributes to an optimization of the process of determining the client device processing choices under bandwidth variation. In some embodiments, the ladder includes a minimum quality of experience (QoE) performance for each client device (or model) under each combination of choices in terms of spatial and temporal visual feature granularities. The QoE for each client (or model) contributes to an optimization for the collectively highest QoE among multiple clients while preserving a desirable QoE for each client. The QoE requirements for different devices may vary, so different priorities are considered in each optimization.

In some embodiments, optimization is controlled by a heuristic process executed by the edge node. An exemplary implementation of the heuristic optimization process is illustrated in FIG. 8A and FIG. 8B, which illustrate an execution flow of an optimization process 800.

Figure 8A:
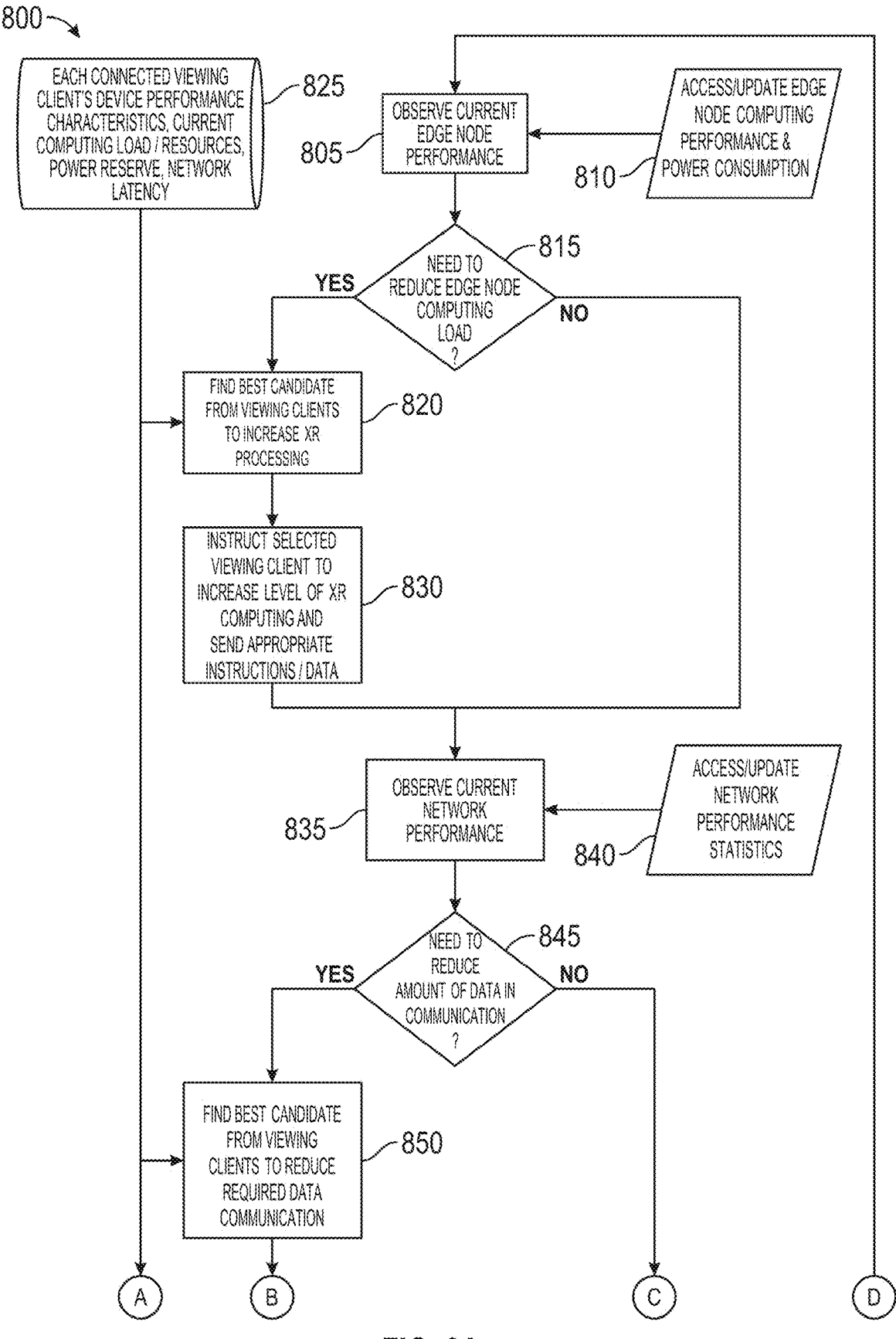
FIG. 8A and FIG. 8B depict a process for optimization at an edge node, in accordance with some embodiments of the disclosure.
Figure 8B:
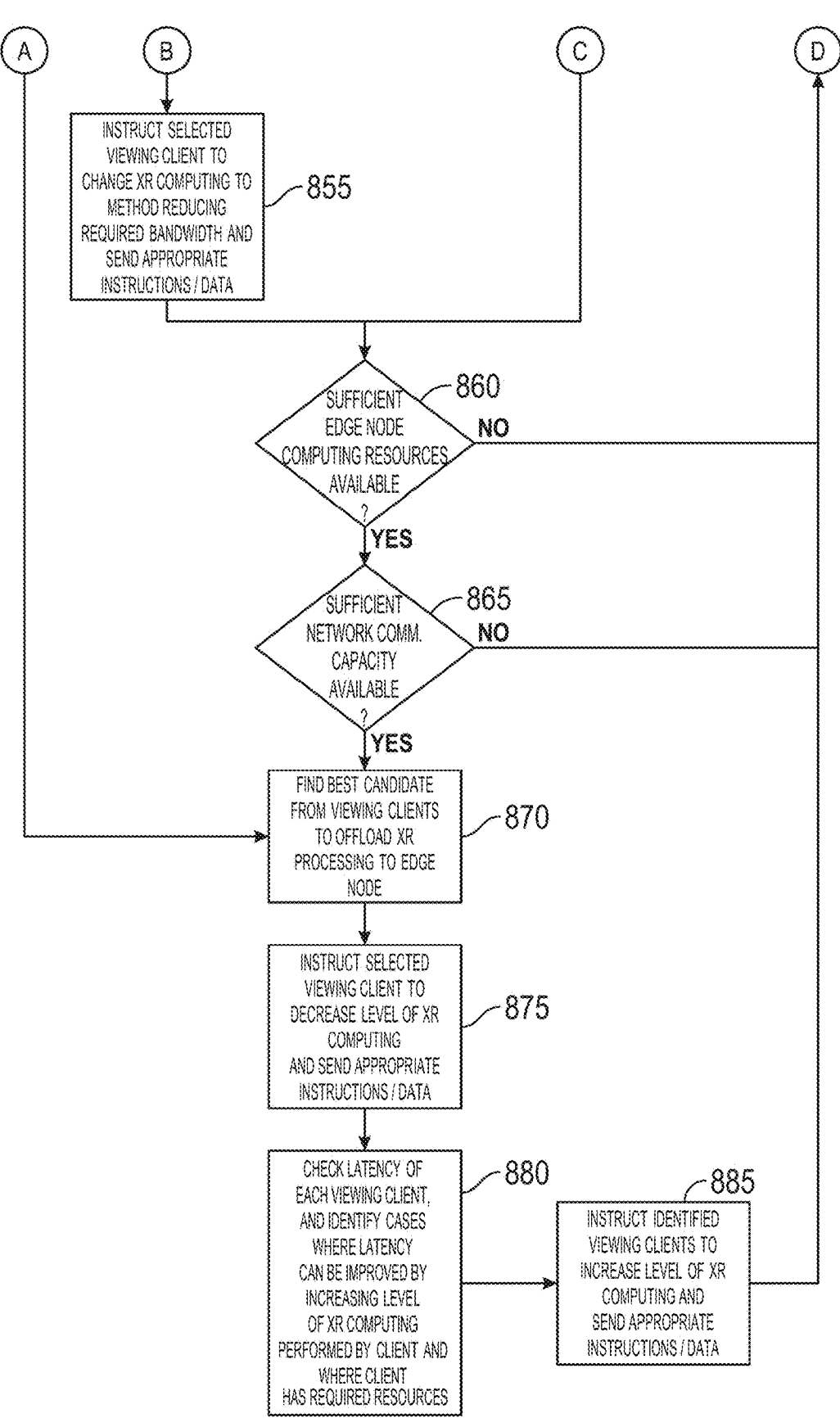

In the optimization process, in some embodiments, the edge node continuously performs the processing steps illustrated in FIG. 8A and FIG. 8B. The processing steps control the XR computing offloading level for each connected viewing client to achieve optimal use of collectively available resources. The process 800 is executed continuously so that the process 800 dynamically adapts to the changing conditions caused by the varying load of the edge node, the number of connected XR viewing clients, and the changing network conditions.

In one iteration of the optimization processing, the edge node first observes the current edge node computing performance and power consumption to determine if the edge node needs to reduce the computing load. If the computing load needs to be reduced by the edge node, the edge node iterates through currently connected XR viewing client performance characteristics and statistics in order to identify the best candidate to increase XR processing on the viewing client side, thus easing the computing load of the edge node.

In some embodiments, the best candidate for increasing the XR computing is identified by calculating the overall quality of experience (QoE) value for each connected XR viewing client. In the QoE evaluation, in some embodiments, each performance term has an associated predetermined function to show how the current performance is translated into a QoE value, and the QoE values calculated for each performance term have some weighting. For example, an available power reserve is translated into a QoE value by using remaining battery power percentage as the translating function multiplied by a weighting. Similarly, in some embodiments, computing resources available at the XR viewing client device are translated into a QoE value by estimating the full computing performance available based on the client device specifications, multiplying that with the current processing capacity consumption percentage, and multiplying that with a weighting set for that term.

In each step where the edge node finds the best candidate from the connected XR viewing clients, the weighting used for calculating each client's QoE value changes according to the conditions for which the edge node is trying to find the best candidate.

In some embodiments, depending on whether the edge node is trying to reduce computing at the edge node side, or if the edge node is trying to reduce the required bandwidth, the edge node instructs the selected viewing client to take different actions. In embodiments where the edge node needs to reduce computing, one goal is to instruct the best candidate client to step up the ladder of XR computation options towards more intensive computing at the client side with the option that reduces the computation needed to be performed at the edge node side. In embodiments where the bandwidth needs to be reduced, the edge node instructs the best candidate to switch to a XR computation option that requires less data to be transmitted between the client and the edge node. That is, computation at the client side is not automatically increased. An XR computing option is provided that reduces, for example, the number of visual feature descriptors sent from the viewing client to the edge node. An XR computing option is provided that requires data to be sent at a reduced frame rate, but not necessarily using less computing.

For example, the process 800 includes observing 805 current edge node performance. The observing 805 is based on edge node computing performance and power consumption data 810. The process 800 includes determining 815 a need to reduce an edge node computing load based on the observing 805. In response to the determining 815 the need to reduce the edge node computing load (815="Yes"), the process 800 continues to find 820 a best candidate from the viewing clients to increase XR processing. The finding 820 is based on data 825 regarding each connected viewing client device. The data 825 includes at least one of a performance characteristic, a current computing load, a current computing resource, power reserve data, network latency data, combinations of the same, or the like. The process 800 includes instructing 830 the selected viewing client to increase the level of XR computing and sending appropriate instructions and/or data for increasing the level of XR computing. The process 800 continues to observe 835 current network performance.

In response to the determining 815 no need to reduce the edge node computing load (815="No"), the process 800 continues to the observing 835 of the current network performance. The observing 835 is based on network performance statistics 840. The process 800 includes determining 845 a need to reduce an amount of data in communication based on the observing 835. In response to the determining 845 the need to reduce the amount of data in communication (845="Yes"), the process 800 continues to find 850 a best candidate from the viewing clients to reduce required data communication. The finding 850 is based on the data 825. The process 800 includes instructing 855 the selected viewing client to change XR computing to a method reducing a required bandwidth and sending appropriate instructions and/or data for reducing the required bandwidth. The process 800 includes determining 860 whether sufficient edge node computing resources are available. In response to the determining 845 no need to reduce the amount of data in communication (845="No"), the process 800 continues to the determining 860.

In response to the determining 860 that insufficient edge node computing resources are available (860="No"), the process 800 returns to the observing 805. In response to the determining 860 that sufficient edge node computing resources are available (860="Yes"), the process 800 continues to determine 865 whether sufficient network communication capacity is available. In response to the determining 865 that sufficient network communication capacity is not available (865="No"), the process 800 returns to the observing 805. In response to the determining 865 that sufficient network communication capacity is available (865="Yes"), the process 800 continues to find 870 a best candidate from the viewing clients to offload XR processing to the edge node. The finding 870 is based on the data 825.

The process 800 includes instructing 875 the selected viewing client to decrease the level of XR computing and sending appropriate instructions and/or data for decreasing the level of XR computing. The process 800 includes checking 880 a latency of each viewing client and identifying cases where the latency can be improved by increasing the level of XR computing performed by the client, which includes, in some embodiments, determining whether the client has required resources for increasing the level of XR computing. The process 800 includes instructing 885 the identified viewing client to increase the level of XR computing and sending appropriate instructions and/or data for increasing the level of XR computing. The process 800 returns to the observing 805.

As an alternative to the heuristic optimization process 800 described above, in some embodiments, the optimization task is formalized as a mixed integer nonlinear programming (MINLP) optimization model. In some embodiments, the MINLP is used for optimizing QoE in XR rendering offloaded to an edge node.

In some embodiments, machine learning is applied for multi-objective optimization. Machine learning is utilized for performing the multi-object optimization required for the optimization task. In this solution, the edge node trains a locally optimized multi-objective optimization neural network. For training the optimization neural network, the edge node runs heuristic or MINLP-based optimization; collects the instructed XR computing distribution options, QoE values, and performance indicators for a certain period; and utilizes the same as training data for training the optimization neural network. When the optimization neural network is trained, the edge node switches to using the trained optimization neural network for the optimization. In some embodiments, an optimization neural network is trained outside the edge node.

A viewing client for a client device is provided. FIG. 9 illustrates a process 900 executed by the viewing client on the client device for running an XR session with the XR computing distribution optimized between the edge node and the client. To start a new XR session, the viewing client requests the edge node to set up an XR session.

At the beginning of viewing client execution, the viewing client will receive a request from the edge node to provide client device specifications indicating the performance characteristics of the client device. This information can include for example client device type, model, information about components such as graphics processing unit, central processing unit, memory and collected performance indicator statistics such as frame rates under previous similar application executions, and the like. The client device may also send information about the current power reserve and/or the rate of current power consumption. The edge node uses this information in determining the possible XR computing distribution models that can be used with the client device.

For example, the process 900 includes requesting 910 an XR service from the edge node. The process 900 includes receiving 920 a device specification request. The process 900 includes collecting 930 and sending device specifications. The process 900 includes runtime processing 940. The process 900 includes terminating 950 XR processing and signaling termination to the edge node.

Figure 10A:
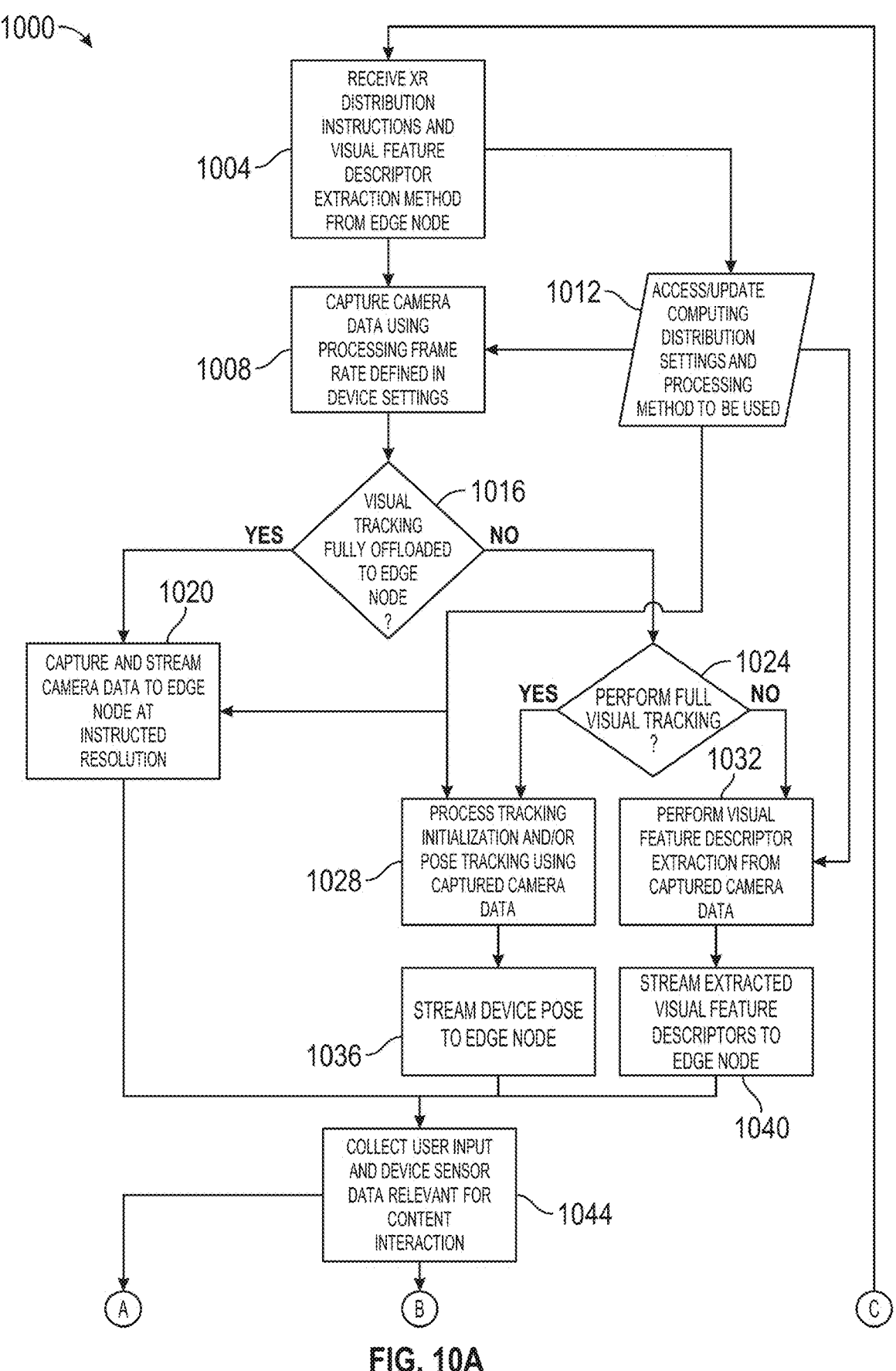
FIG. 10A and FIG. 10B depict a process for XR session runtime processing at a client device, in accordance with some embodiments of the disclosure.
Figure 10B:
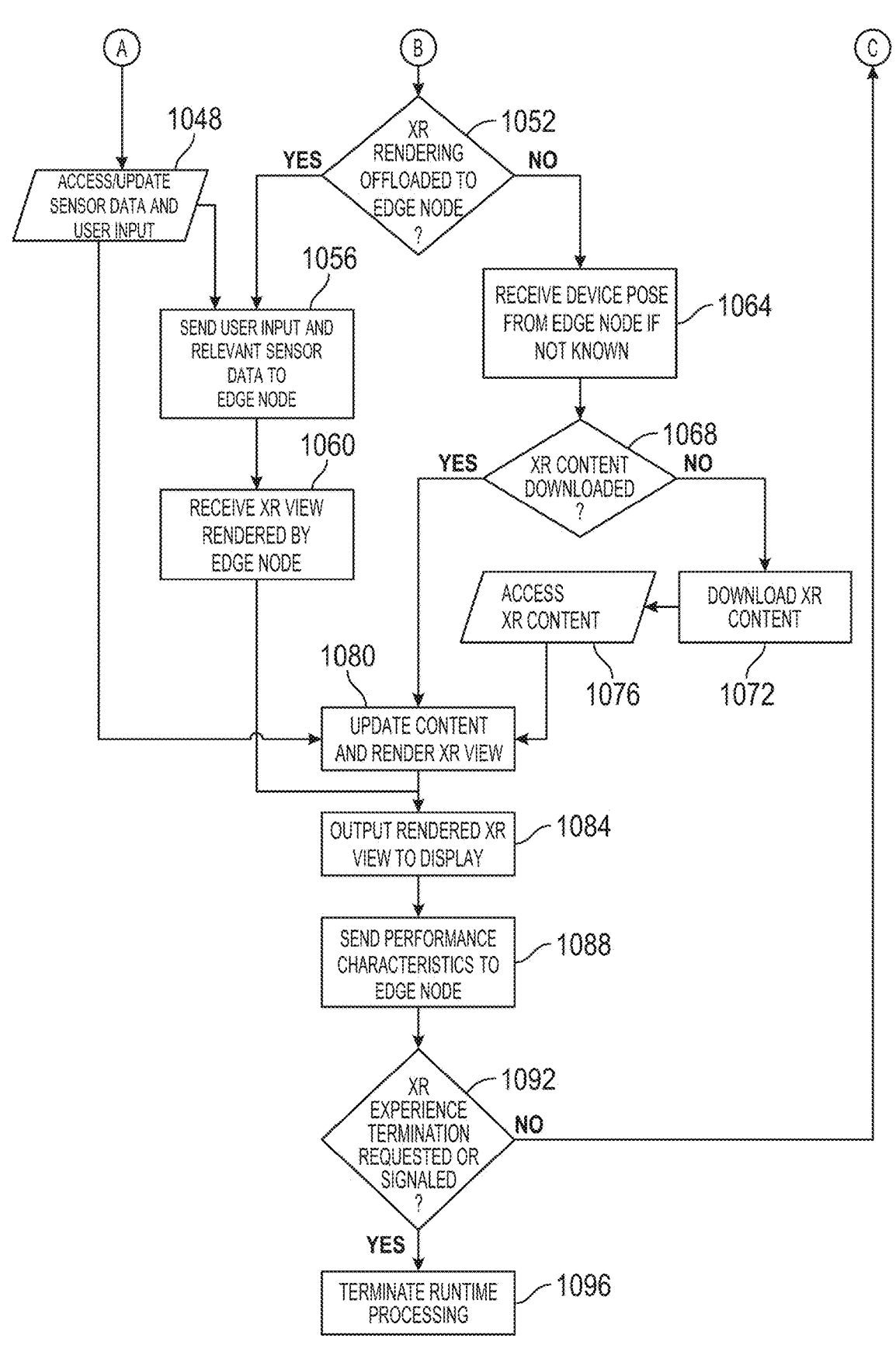

When the viewing client has sent the device specifications, XR session runtime processing is performed, in some embodiments, as a continuous loop during the whole XR session. FIG. 10A and FIG. 10B illustrate a process 1000 performed in each iteration of the runtime processing. In the beginning of this continuous processing, the viewing client receives instructions from the edge node. The instructions include how the viewing client needs to perform XR computing as well as the XR visual feature descriptor extraction method if the viewing client is set to perform the visual feature descriptor extraction. In embodiments when the client device has enough performance capability and reserves, the XR client is instructed to perform the full visual XR tracking by itself.

If the viewing client is set to offload visual tracking completely to the edge node, the viewing client proceeds to capture the device camera data at a given resolution and frame rate and stream it to the edge node. If the viewing client is set to perform visual tracking completely, the viewing client executes the visual initialization. In embodiments where the tracking initialization has been done, the visual tracking is performed using the visual tracking method instructed by the edge node. If the viewing client performs the full visual tracking, the viewing client sends the pose information resulting from the device tracking to the edge node. If the viewing client is set to perform visual feature descriptor extraction, the viewing client performs the visual feature descriptor extraction with the method instructed by the edge node and sends the resulting visual feature descriptor data to the edge node.

In the next step, the viewing client captures the user input and device sensor data relevant for the XR content update. If the XR content rendering is offloaded to the edge node, the viewing client sends the user input and sensor data to the edge node and then receives the XR view rendered by the edge node.

If the viewing client is set to perform XR rendering, the client proceeds to download the XR content, if the content is not yet available from the application memory or data cache. When the data is available, the viewing client updates the XR content based on the captured user input and device sensor data. After updating the content, the viewing client renders the XR content with the device tracking pose resulting from the visual tracking performed by the viewing client or received from the edge node.

The viewing client outputs the XR view stream rendered by the edge node or rendered by the viewing client to the client device display. After outputting the XR view to the device display, the viewing client sends updated performance characteristics to the edge node. The performance characteristics include at least one of information about the current power reserve, processing load, capacity latency, communication latency, combinations of the same, or the like. The edge node uses the performance characteristics to determine computing distribution adaptations required to optimize performance of the edge node and all connected XR client devices as a complete system. After sending the performance characteristics, the viewing client steps back to receiving XR distribution instructions from the edge node as the next iterative step in the XR session runtime execution, unless termination of the ongoing XR session is requested by the user or signaled by the client device OS or the edge node. Regarding the viewing client stepping back to receive XR distribution instructions, in some embodiments, the client device continues to perform the same functionality until it is notified by the edge node of a change or new request.

For example, the process 1000 includes receiving 1004 XR distribution instructions and a visual feature descriptor extraction method from the edge node. After receiving 1004 the XR distribution instructions and the visual feature descriptor extraction method from the edge node, the process 1000 includes updating a database 1012 of distribution settings and the processing method to be used. The process 1000 includes capturing 1008 camera data using a processing frame rate defined in device settings. The capturing 1008 is based on information accessed from the database 1012.

The process 1000 includes determining 1016 whether visual tracking is fully offloaded to the edge node. In response to the determining 1016 that the visual tracking is fully offloaded to the edge node (1016="Yes"), the process 1000 continues to capture 1020 and streaming camera data to the edge node at the instructed resolution. The capturing 1020 is based on information accessed from the database 1012. In response to the determining 1016 that the visual tracking is not fully offloaded to the edge node (1016="No"), the process 1000 continues to determine 1024 whether to perform full visual tracking at the client.

In response to the determining 1024 that full visual tracking should be performed at the client (1024="Yes"), the process 1000 continues to process 1028 tracking initialization and/or pose tracking using captured camera data. The process 1028 is based on information accessed from the database 1012. The process 1000 includes streaming 1036 device pose information to the edge node.

In response to the determining 1024 that full visual tracking should not be performed at the client (1024="No"), the process 1000 continues to perform 1032 visual feature descriptor extraction from the captured camera data. The performing 1032 is based on information accessed from the database 1012. The process 1000 includes streaming 1040 extracted visual feature descriptors to the edge node.

Following the capturing 1020, the streaming 1036, or the streaming 1040, the process 1000 includes collecting 1044 user input and device sensor data relevant for content interaction. After collecting 1044 the user input and device sensor data relevant for the content interaction, the process 1000 includes updating a database 1048 of sensor data and user input.

The process 1000 includes determining 1052 whether XR rendering should be offloaded to the edge node. In response to the determining 1052 the XR rendering should be offloaded to the edge node (1052="Yes"), the process 1000 continues to send 1056 user input and relevant sensor data to the edge node. The sending 1056 is based on information accessed from the database 1048. The process 1000 includes receiving 1060 an XR view rendered by the edge node.

In response to the determining 1052 the XR rendering should not be offloaded to the edge node (1052="No"), the process 1000 continues to receive 1064 a device pose from the edge node if not known and/or when it changes. The process 1000 includes determining 1068 whether XR content is downloaded. In response to the determining 1068 that XR content is downloaded (1068="Yes"), the process 1000 includes updating 1080 the content and rendering an XR view. In response to the determining 1068 that XR content is not downloaded (1068="No"), the process 1000 includes downloading 1072 the XR content. The XR content is stored in an XR content database 1076. The updating 1080 is based on the database 1048 of sensor data and user input. The updating 1080 is based on the XR content database 1076.

Following the receiving 1060 or the updating 1080, the process 1000 includes outputting 1084 the rendered XR view to a display. The process 1000 includes sending 1088 performance characteristics to the edge node. The process 1000 includes determining 1092 whether termination of the XR experience is requested or signaled. In response to the determining 1092 that the termination of the XR experience is requested or signaled (1092="Yes"), the process 1000 continues to terminate 1096 runtime processing. In response to the determining 1092 that the termination of the XR experience is not requested or signaled (1092="No"), the process 1000 returns to the receiving 1004.

Although examples are provided with reference to XR computing, in some embodiments, the systems and processes provided herein are utilized for distributed edge and/or client computing. For example, distributed edge and/or client computing are optimized for computer vision tasks associated with automotive data processing. In some embodiments, automotive data processing includes detecting and tracking other vehicles and pedestrians.

A method 1100 for distributed extended reality (XR) computing optimization for an edge node connectable to a client device and an XR content server across a network is provided. The method 1100 includes accessing 1105 a performance metric of at least one of the edge node, the client device, the XR content server, or the network. The method 1100 includes determining 1110 at the edge node one of a plurality of XR computing distribution ladders based on the performance metric. The method 1100 includes apportioning 1115 at the edge node XR computing between the edge node and the client device based on the one of the plurality of XR computing distribution ladders. The method 1100 includes determining 1120 at the edge node whether visual feature descriptor extraction is to be performed at the client device. The method 1100 includes, in response to determining that the visual feature descriptor extraction is to be performed at the client device (1120="Yes"), transmitting 1125 from the edge node to the client device an indicator for performing the visual feature descriptor extraction at the client device. In some embodiments, the indicator is linked to a downloadable executable file. The method 1100 includes, in response to determining that the visual feature descriptor extraction is not to be performed at the client device (1120="No"), reverting to the accessing 1105 step. The method 1100 includes performing 1130 at the edge node the apportioned XR computing without receiving at the edge node full image data from the client device.

The method 1100 includes requesting 1135 at the edge node a local environment condition of the client device from the client device. The method 1100 includes requesting 1135 at the edge node a computing capability of the client device from the client device. The method 1100 includes determining 1145 at the edge node a load of the edge node. The method 1100 includes requesting 1150 at the edge node a performance metric of the network from the network. The method 1100 includes determining 1155 at the edge node an initialization target for the client device based on the one of the plurality of XR computing distribution ladders. The method 1100 includes selecting 1160 at the edge node one of a plurality of feature descriptor extraction processes for the visual feature descriptor extraction and for tracking initialization at the client device.

The method 1100 includes a subprocess 1200. The subprocess 1200 includes the selecting 1160 at the edge node the one of the plurality of feature descriptor extraction processes for the visual feature descriptor extraction and for the tracking initialization at the client device based on the local environment condition, the computing capability, the load of the edge node, the performance metric of the network, and the initialization target. The subprocess 1200 includes receiving 1205 at the edge node the feature descriptor from the client device without receiving at the edge node full image data from the client device. The subprocess 1200 includes tracking 1210 at the edge node initialization of the client device based on the feature descriptor. The subprocess 1200 includes determining 1215 at the edge node the one or another of the plurality of feature descriptor extraction processes to be used by the client device for frame to frame tracking based on the performance metric. The subprocess 1200 includes transmitting 1220 from the edge node an indicator of the one or the another of the plurality of feature descriptor extraction processes to the client device for another capture of device camera data and extraction of another feature descriptor using the one or the another of the plurality of feature descriptor extraction processes. In some embodiments, the indicator is linked to a downloadable executable file. The subprocess 1200 includes tracking 1225 at the edge node a device pose of the client device using the feature descriptor from the client device. The subprocess 1200 includes rendering 1230 at the edge node XR output based on the device pose. The subprocess 1200 includes transmitting 1235 from the edge node the XR output to the client device for display on the client device.

The method 1100 includes a subprocess 1300. In some embodiments, the subprocess 1300 occurs before the accessing 1105. The subprocess 1300 includes receiving 1305 at the edge node a request for XR service from the client device. The subprocess 1300 includes transmitting 1310 from the edge node a request for an XR executable and XR content to the XR content server. The subprocess 1300 includes receiving 1315 at the edge node the XR executable and the XR content from the XR content server. The subprocess 1300 includes initializing 1320 at the edge node the XR application. The subprocess 1300 includes transmitting 1325 from the edge node a request for a device specification to the client device. The subprocess 1300 includes receiving 1330 at the edge node the device specification from the client device. The subprocess 1300 includes the determining 1110 at the edge node one of a plurality of XR computing distribution ladders based on the performance metric.

A method 1400 for distributed extended reality (XR) computing optimization for a client device 242/249/304 connectable to an edge node 221/308 and an XR content server 207/312 across a network is provided. The method 1400 includes transmitting 1405 at the client device a request for XR service to the edge node. The method 1400 includes receiving 1410 at the client device a request for device specifications from the edge node. The method 1400 includes transmitting 1415 from the client device the device specifications to the edge node. The method 1400 includes transmitting 1420 a performance metric of the client device to the edge node. The method 1400 includes receiving 1425 at the client device an indicator for performing visual feature descriptor extraction from the edge node, where the edge node has determined whether to transmit the indicator based at least in part on the device specifications and the performance metric of the client device. In some embodiments, the indicator is linked to a downloadable executable file. The method 1400 includes, in response to receiving the indicator, extracting 1430 at the client device a feature descriptor. The method 1400 includes transmitting 1435 the feature descriptor to the client device without transmitting to the edge node full image data. The method 1400 includes receiving 1440 at the client device an indicator of one of a plurality of feature descriptor extraction methods for frame to frame tracking determined by the edge node based at least in part on the performance metric of the client device. In some embodiments, the indicator is linked to a downloadable executable file. The method 1400 includes, in response to receiving the indicator, performing at 1445 the client device the frame to frame tracking using the one of the plurality of feature descriptor extraction methods to extract the feature descriptor. The frame to frame tracking is performed, in some embodiments, without transmitting to the edge node full image data. The method 1400 includes capturing 1450 at the client device camera data. The method 1400 includes extracting 1455 at the client device the feature descriptor using the one of the plurality of feature descriptor extraction methods. The method 1400 includes capturing 1460 at the client device user input. The method 1400 includes transmitting 1465 from the client device the feature descriptor and the user input to the edge node for device pose tracking at the edge node without transmitting to the edge node full image data. The method 1400 includes receiving 1470 at the client device rendered output streamed from the edge node. The method 1400 includes causing 1475 to generate, at 396 in FIG. 3B, at the client device instructions for display of the streamed rendered output on an output device of the client device.

The method 1400 includes a subprocess 1500. In some embodiments, the subprocess 1500 occurs at any suitable point after the one of the plurality of XR computing distribution ladders is determined by the edge node and after the device specifications of the client device are obtained. The subprocess 1500 includes receiving 1505 at the client device an indicator of one of a plurality of XR computing distribution ladders determined by the edge node based at least in part on the device specifications of the client device. In some embodiments, the indicator is linked to a downloadable executable file. The subprocess 1500 includes, in response to receiving the indicator, performing 1510 at the client device XR computing based on the one of the plurality of XR computing distribution ladders.

The method 1400 includes a subprocess 1600. The subprocess 1600 includes receiving 1605 at the client device an indicator of one of a plurality of feature descriptor extraction methods for tracking initialization determined by the edge node based at least in part on the performance metric of the client device. In some embodiments, the indicator is linked to a downloadable executable file. The subprocess 1500 includes, in response to receiving the indicator, performing 1610 at the client device the tracking initialization using the one of the plurality of feature descriptor extraction methods to extract the feature descriptor. The tracking initialization is performed, in some embodiments, without transmitting to the edge node full image data.

Predictive Model

Figure 17:
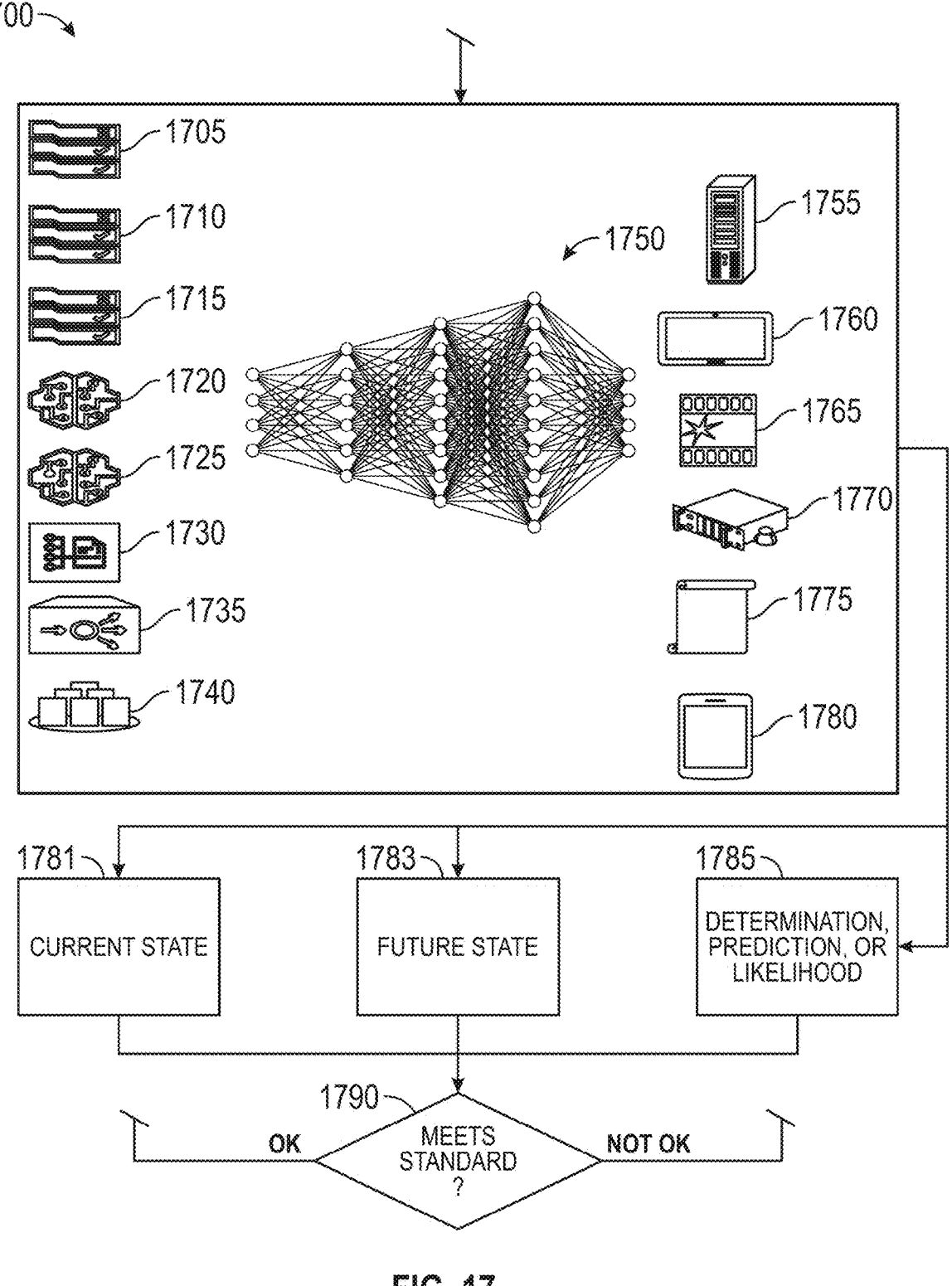
FIG. 17 depicts an artificial intelligence system, in accordance with some embodiments of the disclosure.

Throughout the present disclosure, in some embodiments, determinations, predictions, likelihoods, and the like are determined with one or more predictive models. For example, FIG. 17 depicts a predictive model. A prediction process 1700 includes a predictive model 1750 in some embodiments. The predictive model 1750 receives as input various forms of data about one, more or all the users, media content items, devices, and data described in the present disclosure. The predictive model 1750 performs analysis based on at least one of hard rules, learning rules, hard models, learning models, usage data, load data, analytics of the same, metadata, profile information, combinations of the same, or the like. The predictive model 1750 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 1750 is based on input including at least one of a hard rule 1705, a user-defined rule 1710, a rule defined by a content provider 1715, a hard model 1720, a learning model 1725, combinations of the same, or the like.

The predictive model 1750 receives as input usage data 1730. The predictive model 1750 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 1750 receives as input load-balancing data 1735. The predictive model 1750 is based on at least one of load data of the display device, load data of the requesting media device, load data of the media content item, load data of the communication system or network, load data of the profile, load data of the media device, combinations of the same, or the like.

The predictive model 1750 receives as input metadata 1740. The predictive model 1750 is based on at least one of metadata of the streaming service, metadata of the requesting media device, metadata of the media content item, metadata of the communication system or network, metadata of the profile, metadata of the media device, combinations of the same, or the like. The metadata includes information of the type represented in the media device manifest.

The predictive model 1750 is trained with data. The training data is developed in some embodiments using one or more data processes including but not limited to data selection, data sourcing, and data synthesis. The predictive model 1750 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 1750 is trained in some embodiments with one or more machine learning approaches including but not limited to supervised learning, unsupervised learning, semi-supervised learning, reinforcement learning, and dimensionality reduction. The predictive model 1750 in some embodiments includes regression analysis including analysis of variance (ANOVA), linear regression, logistic regression, ridge regression, and/or time series. The predictive model 1750 in some embodiments includes classification analysis including decision trees and/or neural networks. In FIG. 17, a depiction of a multi-layer neural network is provided as a non-limiting example of a predictive model 1750, the neural network including an input layer (left side), three hidden layers (middle), and an output layer (right side) with 32 neurons and 192 edges, which is intended to be illustrative, not limiting. The predictive model 1750 is based on data engineering and/or modeling processes. The data engineering processes include exploration, cleaning, normalizing, feature engineering, and scaling. The modeling processes include model selection, training, evaluation, and tuning. The predictive model 1750 is operationalized using registration, deployment, monitoring, and/or retraining processes.

The predictive model 1740 is configured to output results to an edge node, a device, or multiple devices. The device includes means for performing one, more, or all the features referenced herein of the systems, methods, processes, inputs, and outputs of one or more of FIGS. 1-16, in any suitable combination. The device is at least one of a server 1755, a tablet 1760, a media display device 1765, a network-connected computer 1770, a media device 1775, a computing device 1780, combinations of the same, or the like. In some embodiments, the predictive model 1740 is used to optimize choices of all devices so that the edge node determines and informs each client device. In some embodiments, the predictive model 1740 outputs to the edge node only.

The predictive model 1750 is configured to output a current state 1781, and/or a future state 1783, and/or a determination, a prediction, or a likelihood 1785, and the like. The current state 1781, and/or the future state 1783, and/or the determination, the prediction, or the likelihood 1785, and the like may be compared 1790 to a predetermined or determined standard. In some embodiments, the standard is satisfied (1490=OK) or rejected (1490=NOT OK). If the standard is satisfied or rejected, the predictive process 1700 outputs at least one of the current state, the future state, the determination, the prediction, the likelihood to any device or module disclosed herein, combinations of the same, or the like.

Communication System

Figure 18:
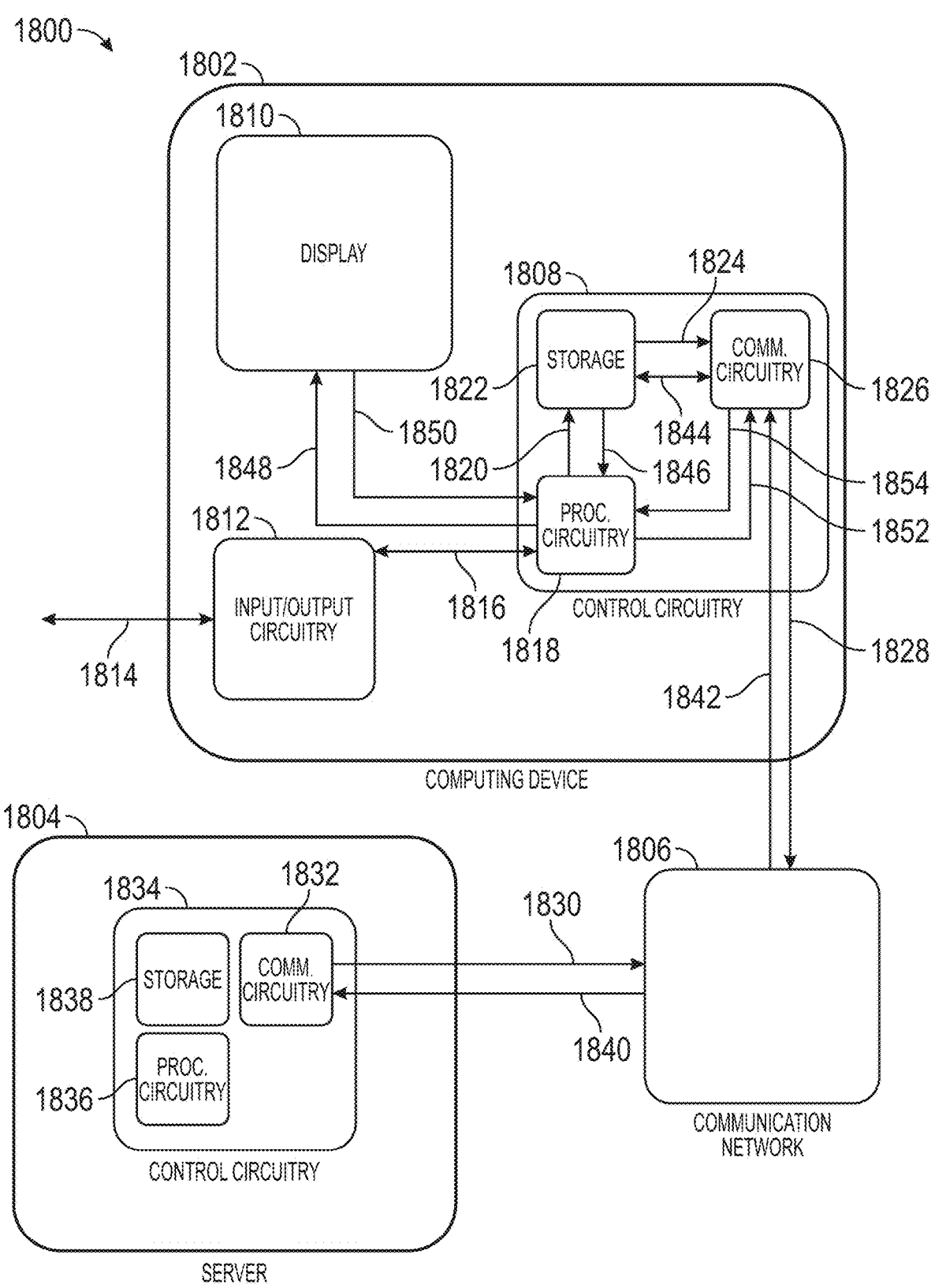
FIG. 18 depicts a system including a server, a communication network, and a computing device for performing the methods and processes noted herein, in accordance with some embodiments of the disclosure.

FIG. 18 depicts a block diagram of system 1800, in accordance with some embodiments. The system is shown to include computing device 1802, server 1804, and a communication network 1806. It is understood that while a single instance of a component may be shown and described relative to FIG. 18, additional embodiments of the component may be employed. For example, server 1804 may include, or may be incorporated in, more than one server. Similarly, communication network 1806 may include, or may be incorporated in, more than one communication network. Server 1804 is shown communicatively coupled to computing device 1802 through communication network 1806. While not shown in FIG. 18, server 1804 may be directly communicatively coupled to computing device 1802, for example, in a system absent or bypassing communication network 1806.

Communication network 1806 may include one or more network systems, such as, without limitation, the Internet, LAN, Wi-Fi, wireless, or other network systems suitable for audio processing applications. The system 1800 of FIG. 18 excludes server 1804, and functionality that would otherwise be implemented by server 1804 is instead implemented by other components of the system depicted by FIG. 18, such as one or more components of communication network 1806. In still other embodiments, server 1804 works in conjunction with one or more components of communication network 1806 to implement certain functionality described herein in a distributed or cooperative manner. Similarly, the system depicted by FIG. 18 excludes computing device 1802, and functionality that would otherwise be implemented by computing device 1802 is instead implemented by other components of the system depicted by FIG. 18, such as one or more components of communication network 1806 or server 1804 or a combination of the same. In other embodiments, computing device 1802 works in conjunction with one or more components of communication network 1806 or server 1804 to implement certain functionality described herein in a distributed or cooperative manner.

Computing device 1802 includes control circuitry 1808, display 1810 and input/output (I/O) circuitry 1812. Control circuitry 1808 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Control circuitry 1808 in turn includes communication circuitry 1826, storage 1822 and processing circuitry 1818. Either of control circuitry 1808 and 1834 may be utilized to execute or perform any or all the systems, methods, processes, inputs, and outputs of one or more of FIGS. 1-17, or any combination of steps thereof (e.g., as enabled by processing circuitries 1818 and 1836, respectively).

In addition to control circuitry 1808 and 1834, computing device 1802 and server 1804 may each include storage (storage 1822, and storage 1838, respectively). Each of storages 1818 and 1838 may be an electronic storage device. As referred to herein, the phrase "electronic storage device" or "storage device" should be understood to mean any device for storing electronic data, computer software, or firmware, such as random-access memory, read-only memory, cloud-based storage, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1822 and 1838 may be used to store several types of content, metadata, and/or other types of data. Non-volatile memory may also be used (e.g., to launch a boot-up routine and other instructions). Cloud-based storage may be used to supplement storages 1818 and 1838 or instead of storages 1818 and 1838. In some embodiments, a user profile and messages corresponding to a chain of communication may be stored in one or more of storages 1818 and 1838. Each of storages 1818 and 1838 may be utilized to store commands, for example, such that when each of processing circuitries 1818 and 1836, respectively, are prompted through control circuitries 1808 and 1834, respectively. Either of processing circuitries 1818 or 1836 may execute any of the systems, methods, processes, inputs, and outputs of one or more of FIGS. 1-17, or any combination of steps thereof.

In some embodiments, control circuitry 1808 and/or 1834 executes instructions for an application stored in memory (e.g., storage 1822 and/or storage 1838). Specifically, control circuitry 1808 and/or 1834 may be instructed by the application to perform the functions discussed herein. In some embodiments, any action performed by control circuitry 1808 and/or 1834 may be based on instructions received from the application. For example, the application may be implemented as software or a set of and/or one or more executable instructions that may be stored in storage 1822 and/or 1838 and executed by control circuitry 1808 and/or 1834. The application may be a client/server application where only a client application resides on computing device 1802, and a server application resides on server 1804.

The application may be implemented using any suitable architecture. For example, it may be a stand-alone application wholly implemented on computing device 1802. In such an approach, instructions for the application are stored locally (e.g., in storage 1822), and data for use by the application is downloaded on a periodic basis (e.g., from an out-of-band feed, from an Internet resource, or using another suitable approach). Control circuitry 1808 may retrieve instructions for the application from storage 1822 and process the instructions to perform the functionality described herein. Based on the processed instructions, control circuitry 1808 may determine a type of action to perform in response to input received from I/O circuitry 1812 or from communication network 1806.

The computing device 1802 is configured to communicate with an I/O device 1860 via the I/O circuitry 1812. The I/O device 1860 includes at least one of the outwardly facing imaging devices 140F, 140R, 140U, 140D, 140P, the inwardly facing imaging device 150, the extended display 260, the infotainment display device 560, the display device 710, the extended display device 760, the user device of FIG. 7C, the XR device of FIG. 7D, the SRVMD 1210, the SRVMD 1310, the SRVMD 1410, the dashboard-mounted display device 1510, the passenger seat back display device 1610, the SRVMD 1710, the SRVMD 1810, the server 2155, the tablet 2160, the media display device 2165, the network-connected computer 2170, the media device 2175, the computing device 2180, combinations of the same, or the like, in some embodiments. In some embodiments, the user input 1814 is received from the I/O device 1860. A wired and/or wireless connection between the I/O circuitry 1812 and the I/O device 1860 is provided in some embodiments.

In client/server-based embodiments, control circuitry 1808 may include communication circuitry suitable for communicating with an application server (e.g., server 1804) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1806). In another example of a client/server-based application, control circuitry 1808 runs a web browser that interprets web pages provided by a remote server (e.g., server 1804). For example, the remote server may store the instructions for the application in a storage device.

The remote server may process the stored instructions using circuitry (e.g., control circuitry 1834) and/or generate displays. Computing device 1802 may receive the displays generated by the remote server and may display the content of the displays locally via display 1810. For example, display 1810 may be utilized to present a string of characters. This way, the processing of the instructions is performed remotely (e.g., by server 1804) while the resulting displays, such as the display windows described elsewhere herein, are provided locally on computing device 1804. Computing device 1802 may receive inputs from the user via input/output circuitry 1812 and transmit those inputs to the remote server for processing and generating the corresponding displays.

Alternatively, computing device 1802 may receive inputs from the user via input/output circuitry 1812 and process and display the received inputs locally, by control circuitry 1808 and display 1810, respectively. For example, input/output circuitry 1812 may correspond to a keyboard and/or a set of and/or one or more speakers/microphones which are used to receive user inputs (e.g., input as displayed in a search bar or a display of FIG. 18 on a computing device). Input/output circuitry 1812 may also correspond to a communication link between display 1810 and control circuitry 1808 such that display 1810 updates in response to inputs received via input/output circuitry 1812 (e.g., simultaneously update what is shown in display 1810 based on inputs received by generating corresponding outputs based on instructions stored in memory via a non-transitory, computer-readable medium).

Server 1804 and computing device 1802 may transmit and receive content and data such as media content via communication network 1806. For example, server 1804 may be a media content provider, and computing device 1802 may be a smart television configured to download or stream media content, such as a live news broadcast, from server 1804. Control circuitry 1834, 1808 may send and receive commands, requests, and other suitable data through communication network 1806 using communication circuitry 1832, 1826, respectively. Alternatively, control circuitry 1834, 1808 may communicate directly with each other using communication circuitry 1832, 1826, respectively, avoiding communication network 1806.

It is understood that computing device 1802 is not limited to the embodiments and methods shown and described herein. In nonlimiting examples, computing device 1802 may be a television, a Smart TV, a set-top box, an integrated receiver decoder (IRD) for controlling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 1802 receives user input 1814 at input/output circuitry 1812. For example, computing device 1802 may receive a user input such as a user swipe or user touch. It is understood that computing device 1802 is not limited to the embodiments and methods shown and described herein.

User input 1814 may be received from a user selection-capturing interface that is separate from device 1802, such as a remote-control device, trackpad, or any other suitable user movement-sensitive, audio-sensitive or capture devices, or as part of device 1802, such as a touchscreen of display 1810. Transmission of user input 1814 to computing device 1802 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, NearLink, ultra-wideband technology, or any other suitable wireless transmission protocol. Input/output circuitry 1812 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, NearLink, ultra-wideband technology, or other wireless transmission protocols.

Processing circuitry 1818 may receive user input 1814 from input/output circuitry 1812 using communication path 1816. Processing circuitry 1818 may convert or translate the received user input 1814 that may be in the form of audio data, visual data, gestures, or movement to digital signals. In some embodiments, input/output circuitry 1812 performs the translation to digital signals. In some embodiments, processing circuitry 1818 (or processing circuitry 1836, as the case may be) conducts disclosed processes and methods.

Processing circuitry 1818 may provide requests to storage 1822 by communication path 1820. Storage 1822 may provide requested information to processing circuitry 1818 by communication path 1846. Storage 1822 may transfer a request for information to communication circuitry 1826 which may translate or encode the request for information to a format receivable by communication network 1806 before transferring the request for information by communication path 1828. Communication network 1806 may forward the translated or encoded request for information to communication circuitry 1832, by communication path 1830.

At communication circuitry 1832, the translated or encoded request for information, received through communication path 1830, is translated or decoded for processing circuitry 1836, which will provide a response to the request for information based on information available through control circuitry 1834 or storage 1838, or a combination thereof. The response to the request for information is then provided back to communication network 1806 by communication path 1840 in an encoded or translated format such that communication network 1806 forwards the encoded or translated response back to communication circuitry 1826 by communication path 1842.

At communication circuitry 1826, the encoded or translated response to the request for information may be provided directly back to processing circuitry 1818 by communication path 1854 or may be provided to storage 1822 through communication path 1844, which then provides the information to processing circuitry 1818 by communication path 1846. Processing circuitry 1818 may also provide a request for information directly to communication circuitry 1826 through communication path 1852, where storage 1822 responds to an information request (provided through communication path 1820 or 1844) by communication path 1824 or 1846 that storage 1822 does not contain information pertaining to the request from processing circuitry 1818.

Processing circuitry 1818 may process the response to the request received through communication paths 1846 or 1854 and may provide instructions to display 1810 for a notification to be provided to the users through communication path 1848. Display 1810 may incorporate a timer for providing the notification or may rely on inputs through input/ output circuitry 1812 from the user, which are forwarded through processing circuitry 1818 through communication path 1848, to determine how long or in what format to provide the notification. When display 1810 determines the display has been completed, a notification may be provided to processing circuitry 1818 through communication path 1850.

The communication paths provided in FIG. 18 between computing device 1802, server 1804, communication network 1806, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

As used herein, the terms "real-time," "simultaneous," "substantially on-demand," and the like are understood to be nearly instantaneous but may include delay due to practical limits of the system. Such delays may be in the order of milliseconds, microseconds or less, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flow-charts or examples relating to some embodiments may be combined with any other embodiment in a suitable manner, done in different orders, or done in parallel. In addition, the methods and systems described herein may be performed in real-time. It should also be noted that the methods and/or systems described herein may be applied to, or used in accordance with, other methods and/or systems.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for distributed extended reality (XR) computing optimization for client devices connectable to edge nodes and XR content servers, the method comprising:

transmitting at a client device a request for XR service;

receiving at the client device a request for device specifications;

transmitting from the client device the device specifications;

transmitting a performance metric of the client device, wherein the performance metric is used to determine one of a plurality of XR computing distribution ladders;

receiving at the client device an indicator for performing visual feature descriptor extraction based at least in part on a determination to transmit the indicator based at least in part on (i) the device specifications, (ii) the performance metric of the client device, and (iii) the determined one of the plurality of XR computing distribution ladders;

based at least in part on receiving the indicator, extracting at the client device a feature descriptor utilizing the determined one of the plurality of XR computing distribution ladders; and transmitting the feature descriptor from the client device without transmitting full image data.

2. The method of claim 1, comprising:

receiving at the client device an indicator of the determined one of the plurality of XR computing distribution ladders based at least in part on the device specifications of the client device; and based at least in part on receiving the indicator, performing at the client device XR computing based on the determined one of the plurality of XR computing distribution ladders.

3. The method of claim 1, comprising:

receiving at the client device an indicator of one of a plurality of feature descriptor extraction processes for tracking initialization based at least in part on the performance metric of the client device; and based at least in part on receiving the indicator, performing at the client device the tracking initialization using the one of the plurality of feature descriptor extraction processes to extract the feature descriptor.

4. The method of claim 3, wherein the tracking initialization is performed without transmitting full image data.

5. The method of claim 3, wherein the plurality of feature descriptor extraction processes includes:

a first feature descriptor extraction process configured for feature descriptor extraction at the client device with offloading of XR rendering, and a second feature descriptor extraction process configured for feature descriptor extraction at the client device with performing of XR rendering on the client device.

6. The method of claim 1, comprising:

receiving at the client device an indicator of one of a plurality of feature descriptor extraction processes for frame to frame tracking based at least in part on the performance metric of the client device; and based at least in part on receiving the indicator, performing at the client device the frame to frame tracking using the one of the plurality of feature descriptor extraction processes to extract the feature descriptor.

7. The method of claim 6, wherein the frame to frame tracking is performed without transmitting full image data.

8. The method of claim 6, wherein the plurality of feature descriptor extraction processes includes:

a first feature descriptor extraction process configured for feature descriptor extraction at the client device with offloading of XR rendering, and a second feature descriptor extraction process configured for feature descriptor extraction at the client device with performing of XR rendering on the client device.

9. The method of claim 6, wherein the performing at the client device the frame to frame tracking using the one of the plurality of feature descriptor extraction processes to extract the feature descriptor includes:

capturing at the client device camera data;

extracting at the client device the feature descriptor using the one of the plurality of feature descriptor extraction processes;

capturing at the client device user input;

transmitting from the client device the feature descriptor and the user input for device pose tracking without transmitting full image data;

receiving at the client device rendered output streamed; and causing to generate at the client device instructions for display of the streamed rendered output on an output device of the client device.

10. The method of claim 1, wherein at least one of the edge nodes determines the one of the plurality of XR computing distribution ladders based at least in part on the performance metric of the client device.

11. A system for distributed extended reality (XR) computing optimization for client devices connectable to edge nodes and XR content servers, the system comprising:

a client device comprising control circuitry, wherein the control circuitry of the client device is configured to:

transmit at the client device a request for XR service;

receive at the client device a request for device specifications;

transmit from the client device the device specifications;

transmit a performance metric of the client device, wherein the performance metric is used to determine one of a plurality of XR computing distribution ladders;

receive at the client device an indicator for performing visual feature descriptor extraction based at least in part on a determination to transmit the indicator based at least in part on (i) the device specifications, (ii) the performance metric of the client device, and (iii) the determined one of the plurality of XR computing distribution ladders;

based at least in part on receiving the indicator, extract at the client device a feature descriptor utilizing the determined one of the plurality of XR computing distribution ladders; and transmit the feature descriptor from the client device without transmitting full image data.

12. The system of claim 11, wherein the control circuitry of the client device is configured to:

receive at the client device an indicator of the determined one of the plurality of XR computing distribution ladders based at least in part on the device specifications of the client device; and based at least in part on receiving the indicator, perform at the client device XR computing based on the determined one of the plurality of XR computing distribution ladders.

13. The system of claim 11, wherein the control circuitry of the client device is configured to:

receive at the client device an indicator of one of a plurality of feature descriptor extraction systems for tracking initialization based at least in part on the performance metric of the client device; and based at least in part on receiving the indicator, perform at the client device the tracking initialization using the one of the plurality of feature descriptor extraction systems to extract the feature descriptor.

14. The system of claim 13, wherein the tracking initialization is performed without transmitting full image data.

15. The system of claim 13, wherein the plurality of feature descriptor extraction processes includes:

a first feature descriptor extraction process configured for feature descriptor extraction at the client device with offloading of XR rendering, and a second feature descriptor extraction process configured for feature descriptor extraction at the client device with performing of XR rendering on the client device.

16. The system of claim 11, wherein the control circuitry of the client device is configured to:

receive at the client device an indicator of one of a plurality of feature descriptor extraction systems for frame to frame tracking based at least in part on the performance metric of the client device; and based at least in part on receiving the indicator, perform at the client device the frame to frame tracking using the one of the plurality of feature descriptor extraction systems to extract the feature descriptor.

17. The system of claim 16, wherein the frame to frame tracking is performed without transmitting full image data.

18. The system of claim 16, wherein the plurality of feature descriptor extraction processes includes:

a first feature descriptor extraction process configured for feature descriptor extraction at the client device with offloading of XR rendering, and a second feature descriptor extraction process configured for feature descriptor extraction at the client device with performing of XR rendering on the client device.

19. The system of claim 16, wherein the control circuitry of the client device configured to perform at the client device the frame to frame tracking using the one of the plurality of feature descriptor extraction systems to extract the feature descriptor is configured to:

capture at the client device camera data;

extract at the client device the feature descriptor using the one of the plurality of feature descriptor extraction systems;

capture at the client device user input;

transmit from the client device the feature descriptor and the user input for device pose tracking without transmitting full image data;

receive at the client device rendered output streamed; and cause to generate at the client device instructions for display of the streamed rendered output on an output device of the client device.

20. The system of claim 11, wherein at least one of the edge nodes determines the one of the plurality of XR computing distribution ladders based at least in part on the performance metric of the client device.

* * * * *